United States Patent
Zhang et al.

(10) Patent No.: US 11,082,108 B2
(45) Date of Patent: Aug. 3, 2021

(54) CHANNEL STATE INFORMATION TRANSMISSION METHOD, ACCESS NETWORK DEVICE, AND TERMINAL DEVICE

(71) Applicant: HUAWEI TECHNOLOGIES CO., LTD., Guangdong (CN)

(72) Inventors: Di Zhang, Beijing (CN); Ruiqi Zhang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 85 days.

(21) Appl. No.: 16/521,318

(22) Filed: Jul. 24, 2019

(65) Prior Publication Data

US 2019/0349053 A1    Nov. 14, 2019

Related U.S. Application Data

(63) Continuation of application No. PCT/CN2017/072683, filed on Jan. 25, 2017.

(51) Int. Cl.
  *H04B 7/06* (2006.01)
  *H04L 5/14* (2006.01)

(52) U.S. Cl.
  CPC ......... *H04B 7/0626* (2013.01); *H04B 7/0639* (2013.01); *H04L 5/14* (2013.01)

(58) Field of Classification Search
  CPC .... H04B 7/0626; H04B 7/0639; H04B 7/063; H04B 7/0478; H04L 1/0016; H04L 1/0022; H04L 1/0033
  See application file for complete search history.

(56) References Cited

U.S. PATENT DOCUMENTS

| | | | |
|---|---|---|---|
| 9,608,708 B2* | 3/2017 | Wang | H04B 7/0417 |
| 10,784,932 B2* | 9/2020 | Wang | H04B 7/0617 |

(Continued)

FOREIGN PATENT DOCUMENTS

| | | |
|---|---|---|
| CN | 101834708 A | 9/2010 |
| CN | 101969363 A | 2/2011 |
| CN | 103004104 A | 3/2013 |

(Continued)

OTHER PUBLICATIONS

3GPP TSG RAN WG1 RAN1 NR AdHoc, R1-1700801, : "Discussion on CSI Acquisition, ", Qualcomm Incorporated, Jan. 16-20, 2017Spokane, U.S.A. total 8 pages.

3GPP TSG RAN WG1 Meeting #61bis,R1-104088,:"Discussion of two-stage feedback proposals",Alcatel-Lucent Shanghai Bell, Alcatel-Lucent,Dresden,Germany, Jun. 28-Jul. 2, 2010, total 15 pages.

(Continued)

*Primary Examiner* — Min Jung
(74) *Attorney, Agent, or Firm* — Womble Bond Dickinson (US) LLP

(57) ABSTRACT

This application provides a channel state information transmission method, an access network device, and a terminal device. The method includes: receiving, by an access network device, CSI reported by a terminal device, where the CSI includes a first PMI and a second PMI; and determining, by the access network device based on the first PMI and the second PMI, a precoding matrix W whose rank is greater than or equal to 2, where W meets $W = W_1 \times W_2$, and the second PMI is used to indicate some column vectors in $W_2$. According to the method in the embodiment, overheads of feeding back the CSI by the terminal device are effectively reduced.

20 Claims, 3 Drawing Sheets

(56) References Cited

U.S. PATENT DOCUMENTS

| | | | |
|---|---|---|---|
| 2012/0051257 A1* | 3/2012 | Kim | H04B 7/0617 |
| | | | 370/252 |
| 2012/0219042 A1 | 8/2012 | Onggosanusi et al. | |
| 2013/0070723 A1 | 3/2013 | Yie et al. | |
| 2013/0136065 A1 | 5/2013 | Chen et al. | |
| 2015/0288499 A1* | 10/2015 | Nam | H04B 7/0478 |
| | | | 370/329 |
| 2015/0304008 A1* | 10/2015 | Wang | H04B 7/0634 |
| | | | 375/267 |
| 2016/0352401 A1 | 12/2016 | Yu et al. | |
| 2018/0041265 A1 | 2/2018 | Su | |
| 2018/0167124 A1 | 6/2018 | Chen et al. | |
| 2018/0254816 A1* | 9/2018 | Liu | H04B 7/0626 |
| 2020/0119796 A1* | 4/2020 | Zhang | H04B 7/0626 |

FOREIGN PATENT DOCUMENTS

| | | |
|---|---|---|
| CN | 105519030 A | 4/2016 |
| CN | 106209195 A | 12/2016 |
| CN | 106302269 A | 1/2017 |
| CN | 106330272 A | 1/2017 |
| EP | 2959621 B1 | 8/2018 |
| EP | 3523888 A1 | 8/2019 |
| WO | 2017003208 A1 | 1/2017 |
| WO | 2018088739 A1 | 5/2018 |

OTHER PUBLICATIONS

3GPP TSG-RAN WG1 #87ah-NR ,R1-1700752,:"Type II CSI Feedback",Ericsson,Spokane, WA, USA, Jan. 16-20, 2017,total 8 pages.

* cited by examiner

CHANNEL STATE INFORMATION TRANSMISSION METHOD, ACCESS NETWORK DEVICE, AND TERMINAL DEVICE

CROSS-REFERENCE TO RELATED APPLICATIONS

This application is a continuation of International Application No. PCT/CN2017/072683, filed on Jan. 25, 2017, the disclosure of which is hereby incorporated by reference in its entirety.

TECHNICAL FIELD

This application relates to mobile communications technologies, and in particular, to a channel state information transmission method, an access network device, and a terminal device.

BACKGROUND

In a long term evolution (Long Term Evolution, LTE for short) frequency division duplex (Frequency Division Duplexing, FDD for short) system, a terminal device performs channel estimation by using a reference signal sent by a network device, to obtain channel state information (Channel State Information, CSI for short) of a downlink channel, and feeds back the CSI to the network device. For example, the terminal device sends a precoding matrix index (Precoding Matrix Index, PMI for short), a rank index (Rank Index, RI for short), and a channel quality index (Channel Quality Index, CQI for short) to the network device, and the network device selects, based on the index information, a precoding matrix from a codebook agreed on with UE, and further precodes to-be-sent downlink data by using the precoding matrix, to improve downlink communication quality. Therefore, accuracy of the CSI fed back by the terminal device affects the downlink communication quality, and how to improve precision of the CSI fed back by the terminal device is particularly important.

A prior method to improve precision of CSI fed back by a terminal device has the terminal device feed back the CSI to a base station by using a two-stage feedback mechanism ($W=W_1 \times W_2$). Specifically, $W_1$ represents a first-stage feedback matrix, $W_2$ represents a second-stage feedback matrix, and $$W_1 = \begin{bmatrix} B & 0 \\ 0 & B \end{bmatrix}.$$

When a rank of a precoding matrix determined by the terminal device is 1 (rank=1), $$W_2 = \begin{bmatrix} c_{0,0} \\ c_{0,1} \\ c_{0,2} \\ c_{0,3} \end{bmatrix}.$$

When a rank of a precoding matrix determined by the terminal device is 2 (rank=2), $$W_2 = \begin{bmatrix} c_{0,0} & c_{1,0} \\ c_{0,1} & c_{1,1} \\ c_{0,2} & c_{1,2} \\ c_{0,3} & c_{1,3} \end{bmatrix}.$$

$B=[p_0 b_0, \ldots, p_{L-1} b_{L-1}]$, $p_{L-1}$ represents amplitude information of a linear weighted value of each column vector in $W_1$, $b_{L-1}$ represents each column vector in $W_1$, and $C_{i,j}$ represents phase information of the linear weighted value of each column vector in $W_1$. After determining the matrix $W_1$ and the matrix $W_2$, the terminal device reports index information of $W_1$ and index information of $W_2$ to the base station. After obtaining the index information of $W_1$, the base station may calculate a non-constant modulus matrix $W_1$ (in the non-constant modulus matrix, moduli of elements are not completely the same), obtain a constant modulus matrix $W_2$ based on the index information of $W_2$ (in the constant modulus matrix, moduli of elements are the same), and finally obtain a non-constant modulus matrix $W$, so that the base station can precode to-be-sent downlink data based on the non-constant modulus matrix $W$.

However, in the foregoing feedback manner, when the rank of the determined precoding matrix is greater than 2, if the terminal device still uses the foregoing feedback manner, feedback overheads are relatively high, leading to a great waste of uplink resources.

SUMMARY

Embodiments of this application provide a channel state information transmission method, an access network device, and a terminal device, to resolve a prior-art technical problem of a waste of uplink resources caused by relatively high feedback overheads of feeding back, by a terminal device, CSI to an access network device when a rank of a determined precoding matrix is greater than 2.

According to a first aspect, an embodiment provides a channel state information transmission method, including:

receiving, by an access network device, channel state information CSI reported by a terminal device, where the CSI includes a first precoding matrix indicator PMI and a second PMI; and determining, by the access network device, a precoding matrix W based on the first PMI and the second PMI, where W meets $W=W_1 \times W_2$, where $W_1$ corresponds to the first PMI, $W_2$ corresponds to the second PMI, the second PMI is used to indicate some column vectors in $W_2$, and a rank of W is greater than or equal to 2.

According to the channel state information transmission method provided above, after determining, based on a reference signal delivered by the access network device, the precoding matrix W ($W=W_1 \times W_2$) whose rank is greater than or equal to 2, the terminal device sends the CSI including the first PMI and the second PMI to the access network device, where the second PMI is used to indicate the some column vectors in $W_2$, so that the access network device obtains the precoding matrix W based on the first PMI and the second PMI. In other words, in this embodiment, when the rank of the precoding matrix W is greater than or equal to 2, the terminal device does not need to report indexes of all elements in $W_2$ to the access network device, and needs to report, to the access network device, only the second PMI used to indicate the some column vectors in $W_2$. This effectively reduces overheads of feeding back, by the terminal device, the CSI to the access network device, and avoids a waste of uplink resources. In addition, the precoding matrix W determined in this embodiment of this application is a non-constant modulus matrix. Compared with a precoding matrix determined by an access network device in Rel13 and a release earlier than Rel13, precision of the precoding matrix is greatly improved.

In one design, the method further includes:

receiving, by the access network device, a CQI reported by the terminal device, where the CQI is determined by the terminal device based on an orthogonal precoding matrix $W_0$.

According to the channel state information transmission method provided in the possible design, after determining the precoding matrix W, the terminal device may perform an orthogonalization operation on W to obtain the orthogonal precoding matrix $W_0$, then determine the CQI based on the orthogonal precoding matrix $W_0$, and report the CQI to the access network device. This improves CQI precision.

In one design, the method further includes:

performing, by the access network device, an orthogonalization operation on W to obtain the orthogonal precoding matrix $W_0$, where any two column vectors in $W_0$ are orthogonal to each other, and the orthogonalization operation includes any one of the following operations: Schmidt orthogonalization, a zero-forcing algorithm, SVD decomposition, and QR decomposition.

According to the channel state information transmission method provided in the possible design, the access network device performs the orthogonalization operation on W to obtain the orthogonal precoding matrix $W_0$, and sends downlink data based on $W_0$. This reduces mutual interference between downlink data in a sending process.

According to a second aspect, an embodiment provides a channel state information transmission method, including:

determining, by a terminal device, a precoding matrix W based on a reference signal delivered by an access network device, where W meets $W=W_1 \times W_2$; and sending, by the terminal device, channel state information CSI to the access network device, where the CSI includes a first precoding matrix indicator PMI and a second PMI, $W_1$ corresponds to the first PMI, $W_2$ corresponds to the second PMI, the second PMI is used to indicate some column vectors in $W_2$, and a rank of W is greater than or equal to 2.

In one design, the method further includes:

performing, by the terminal device, an orthogonalization operation on W to obtain an orthogonal precoding matrix $W_0$, where any two column vectors in $W_0$ are orthogonal to each other, and the orthogonalization operation includes any one of the following operations: Schmidt orthogonalization, a zero-forcing algorithm, SVD decomposition, and QR decomposition; and determining, by the terminal device, a CQI based on $W_0$, and sending the CQI to the access network device.

For a beneficial effect of the channel state information transmission method provided in the second aspect and one design of the second aspect, refer to the technical effect of the first aspect and the designs of the first aspect. Details are not described herein again.

With reference to the first aspect and the second aspect, in one design, the second PMI includes an index of a quantized value obtained by quantizing each element other than a first element in $$\left\lceil \frac{N}{2} \right\rceil$$

columns of column vectors in $W_2$, where there is a preset association relationship between $$N - \left\lceil \frac{N}{2} \right\rceil$$

remaining column vectors in $W_2$ and the $$\left\lceil \frac{N}{2} \right\rceil$$

columns of column vectors, N is a quantity of columns of $W_2$, and the first element is an element that remains unchanged in the $$\left\lceil \frac{N}{2} \right\rceil$$

columns of column vectors.

In one design, the second PMI includes an index of a quantized value obtained by quantizing each element other than the first element in the first $$\left\lceil \frac{N}{2} \right\rceil$$

columns of column vectors in $W_2$, where there is a preset association relationship exists between $$N - \left\lceil \frac{N}{2} \right\rceil$$

remaining column vectors in $W_2$ and the first $$\left\lceil \frac{N}{2} \right\rceil$$

columns of column vectors.

In one design, the second PMI is further used to indicate an association relationship between the some column vectors and remaining column vectors other than the some column vectors in $W_2$.

In one design, the second PMI includes an index of a quantized value obtained by quantizing each element other than a first element in $$\left\lceil \frac{N}{2} \right\rceil$$

columns of column vectors in $W_2$ and a relationship between $$N - \left\lceil \frac{N}{2} \right\rceil$$

remaining column vectors in $W_2$ and the $\left\lceil \frac{N}{2} \right\rceil$ columns of column vectors, N is a quantity of columns of $W_2$, and the first element is an element that remains unchanged in the $\left\lceil \frac{N}{2} \right\rceil$ columns of column vectors.

In one design, the second PMI includes:
an index of a quantized value obtained by quantizing each element other than the first element in the first $\left\lceil \frac{N}{2} \right\rceil$ columns of column vectors in $W_2$ and an association relationship between the $N - \left\lceil \frac{N}{2} \right\rceil$ remaining column vectors in $W_2$ and the first $\left\lceil \frac{N}{2} \right\rceil$ columns of column vectors.

In one design, the association relationship between the $N - \left\lceil \frac{N}{2} \right\rceil$ remaining column vectors in $W_2$ and the first $\left\lceil \frac{N}{2} \right\rceil$ columns of column vectors specifically includes:
a phase association relationship between elements in a column vector in a $\left(k + \left\lceil \frac{N}{2} \right\rceil\right)^{th}$ column of $W_2$ and elements in a column vector in a $k^{th}$ column of $W_2$, where k is a positive integer in $\left[1, \left\lceil \frac{N}{2} \right\rceil\right]$.

In one design, $W_2$ represents a matrix including M rows and N columns, where M is an even number, and in this case, the phase association relationship between the elements in the column vector in the $\left(k + \left\lceil \frac{N}{2} \right\rceil\right)^{th}$ column of $W_2$ and the elements in the column vector in the $k^{th}$ column of $W_2$ includes:

$$c_{m,(k+\left\lceil \frac{N}{2} \right\rceil)} = a_m * c_{m,k},$$

where $c_{m,k}$ represents an element in an $m^{th}$ row and the $k^{th}$ column of $W_2$, $$c_{m,(k+\left\lceil \frac{N}{2} \right\rceil)}$$

represents an element in the $m^{th}$ row and the $\left(k + \left\lceil \frac{N}{2} \right\rceil\right)^{th}$ column of $W_2$, $$a_p * conj\left(a_{p+\frac{M}{2}}\right) = -1,$$

m is a positive integer in [1, M], p is a positive integer in $\left[1, \frac{M}{2}\right]$, and $a_1, a_2, \ldots, a_m$ are not completely the same.

In one design $a_m \in \{1, -1, j, -j\}$.

In one design, when N=3, the phase association relationship between the elements in the column vector in the $\left(k + \left\lceil \frac{N}{2} \right\rceil\right)^{th}$ column of $W_2$ and the elements in the column vector in the $k^{th}$ column of $W_2$ may include any one of a first association relationship, a second association relationship, a third association relationship, and a fourth association relationship, where the first association relationship includes: elements in the first two rows of a column vector in a third column of $W_2$ are the same as elements in the first two rows of a column vector in a first column of $W_2$, and elements in the last two rows of the column vector in the third column of $W_2$ are values obtained by rotating phases of elements in the last two rows of the column vector in the first column by 180 degrees;

the second association relationship includes: elements in a first row and a fourth row of the column vector in the third column are respectively the same as elements in a first row and a fourth row of the column vector in the first column, and elements in a second row and a third row of the column vector in the third column are respectively values obtained by rotating phases of elements in a second row and a third row of the column vector in the first column by 180 degrees;

the third association relationship includes: the element in the first row of the column vector in the third column is the same as the element in the first row of the column vector in the first column, the element in the second row of the column vector in the third column is a value obtained by rotating the element in the second row of the column vector in the first column by 90 degrees, the element in the third row of the column vector in the third column is a value obtained by rotating the element in the third row of the column vector in the first column by 180 degrees, and the element in the fourth row of the column vector in the third column is a value obtained by rotating the element in the fourth row of the column vector in the first column by 270 degrees; and the fourth association relationship includes: the element in the first row of the column vector in the third column is the same as the element in the first row of the column vector in the first column, the element in the second row of the column vector in the third column is a value obtained by rotating the element in the second row of the column vector in the first column by 270 degrees, the element in the third row of the column vector in the third column is a value obtained by rotating the element in the third row of the column vector in the first column by 180 degrees, and the element in the fourth row of the column vector in the third column is a value obtained by rotating the element in the fourth row of the column vector in the first column by 90 degrees.

In one design, when N=4, the phase association relationship between the elements in the column vector in the $$\left(k + \left\lceil \frac{N}{2} \right\rceil\right)^{th}$$

column of $W_2$ and the elements in the column vector in the $k^{th}$ column of $W_2$ may include any one of a fifth association relationship, a sixth association relationship, a seventh association relationship, and an eighth association relationship, where the fifth association relationship includes: elements in the first two rows of a column vector in a third column of $W_2$ are the same as elements in the first two rows of a column vector in a first column of $W_2$, elements in the first two rows of a column vector in a fourth column of $W_2$ are the same as elements in the first two rows of a column vector in a second column of $W_2$, elements in the last two rows of the column vector in the third column are values obtained by rotating phases of elements in the last two rows of the column vector in the first column by 180 degrees, and elements in the last two rows of the column vector in the fourth column are values obtained by rotating phases of elements in the last two rows of the column vector in the second column by 180 degrees;

the sixth association relationship includes: elements in a first row and a fourth row of the column vector in the third column are the same as elements in a first row and a fourth row of the column vector in the first column, elements in a first row and a fourth row of the column vector in the fourth column are the same as elements in a first row and a fourth row of the column vector in the second column, elements in a second row and a third row of the column vector in the third column are values obtained by rotating phases of elements in a second row and a third row of the column vector in the first column by 180 degrees, and elements in a second row and a third row of the column vector in the fourth column are values obtained by rotating phases of elements in a second row and a third row of the column vector in the second column by 180 degrees;

the seventh association relationship includes: the element in the first row of the column vector in the third column is the same as the element in the first row of the column vector in the first column, the element in the second row of the column vector in the third column is a value obtained by rotating the element in the second row of the column vector in the first column by 90 degrees, the element in the third row of the column vector in the third column is a value obtained by rotating the element in the third row of the column vector in the first column by 180 degrees, the element in the fourth row of the column vector in the third column is a value obtained by rotating the element in the fourth row of the column vector in the first column by 270 degrees, the element in the first row of the column vector in the fourth column is the same as the element in the first row of the column vector in the second column, the element in the second row of the column vector in the fourth column is a value obtained by rotating the element in the second row of the column vector in the second column by 90 degrees, the element in the third row of the column vector in the fourth column is a value obtained by rotating the element in the third row of the column vector in the second column by 180 degrees, and the element in the fourth row of the column vector in the fourth column is a value obtained by rotating the element in the fourth row of the column vector in the second column by 270 degrees; and the eighth association relationship includes: the element in the first row of the column vector in the third column is the same as the element in the first row of the column vector in the first column, the element in the second row of the column vector in the third column is a value obtained by rotating the element in the second row of the column vector in the first column by 270 degrees, the element in the third row of the column vector in the third column is a value obtained by rotating the element in the third row of the column vector in the first column by 180 degrees, the element in the fourth row of the column vector in the third column is a value obtained by rotating the element in the fourth row of the column vector in the first column by 90 degrees, the element in the first row of the column vector in the fourth column is the same as the element in the first row of the column vector in the second column, the element in the second row of the column vector in the fourth column is a value obtained by rotating the element in the second row of the column vector in the second column by 270 degrees, the element in the third row of the column vector in the fourth column is a value obtained by rotating the element in the third row of the column vector in the second column by 180 degrees, and the element in the fourth row of the column vector in the fourth column is a value obtained by rotating the element in the fourth row of the column vector in the second column by 90 degrees.

According to a third aspect, an embodiment provides an access network device to implement the channel state information transmission method according to the first aspect. The access network device has a function of implementing the channel state information transmission method. The function may be implemented by hardware, or may be implemented by hardware executing corresponding software. The hardware or software includes one or more modules corresponding to the function.

In one implementation of the third aspect, the access network device includes a plurality of function modules or units, configured to implement the channel state information transmission method according to any one of the first aspect or the possible designs of the first aspect.

In another implementation of the third aspect, a structure of the access network device may include a processor and a receiver and a transmitter (or a transceiver). The processor is configured to support the apparatus in executing corresponding functions in the channel state information transmission method according to any one of the first aspect or the possible designs of the first aspect. The transceiver is configured to support communication between the apparatus and another network device or a terminal device, and may be, for example, a corresponding radio frequency module or baseband module. The apparatus may further include a memory. The memory is configured to be coupled to the processor, and stores a program instruction and data that are required by the access network device to perform the channel state information transmission method. Optionally, the access network device may be a base station.

According to a fourth aspect, an embodiment provides a terminal device to implement the channel state information transmission method in the second aspect. The terminal device has a function of implementing the channel state information transmission method. The function may be implemented by hardware, or may be implemented by hardware executing corresponding software. The hardware or software includes one or more modules corresponding to the function.

In one implementation of the fourth aspect, the terminal device includes a plurality of function modules or units, configured to implement the channel state information transmission method according to any one of the first aspect or the designs of the first aspect.

In another implementation of the fourth aspect, a structure of the terminal device may include a processor and a receiver and a transmitter (or a transceiver). The processor is configured to support the apparatus in executing corresponding functions in the channel state information transmission method according to any one of the first aspect or the designs of the first aspect. The transceiver is configured to support communication between the apparatus and an access network device, and may be, for example, a corresponding radio frequency module or baseband module. The apparatus may further include a memory. The memory is configured to be coupled to the processor, and stores a program instruction and data that are required by the access network device to perform the channel state information transmission method.

According to a fifth aspect, an embodiment provides a computer storage medium, configured to store a computer software instruction used by the access network device. The computer storage medium includes a program designed for executing the first aspect.

According to a sixth aspect, an embodiment provides a computer storage medium, configured to store a computer software instruction used by the terminal device. The computer storage medium includes a program designed for executing the second aspect.

According to a seventh aspect, an embodiment provides a computer program product, including an instruction. When the computer program is executed by a computer, the instruction enables the computer to execute functions executed by the access network device in the foregoing method.

According to an eighth aspect, an embodiment provides a computer program product, including an instruction. When the computer program is executed by a computer, the instruction enables the computer to execute functions executed by the terminal device in the foregoing method.

According to the method and the device that are provided in the disclosed embodiments, after determining, based on the reference signal delivered by the access network device, the precoding matrix W ($W=W_1 \times W_2$) whose rank is greater than or equal to 2, the terminal device sends the CSI including the first PMI and the second PMI to the access network device, where the second PMI is used to indicate the some column vectors in $W_2$, so that the access network device obtains the precoding matrix W based on the first PMI and the second PMI. In other words, in the embodiments of this application, when the rank of the precoding matrix W is greater than or equal to 2, the terminal device does not need to report the indexes of all elements in $W_2$ to the access network device, and needs to report, to the access network device, only the second PMI used to indicate the some column vectors in $W_2$. This effectively reduces the overheads of feeding back, by the terminal device, the CSI to the access network device, and avoids a waste of uplink resources. In addition, the precoding matrix W determined in the embodiments of this application is a non-constant modulus matrix. Compared with a precoding matrix determined by an access network device in Rel13 and a release earlier than Rel3, precision of the precoding matrix is greatly improved.

DESCRIPTION OF EMBODIMENTS

Figure 1:
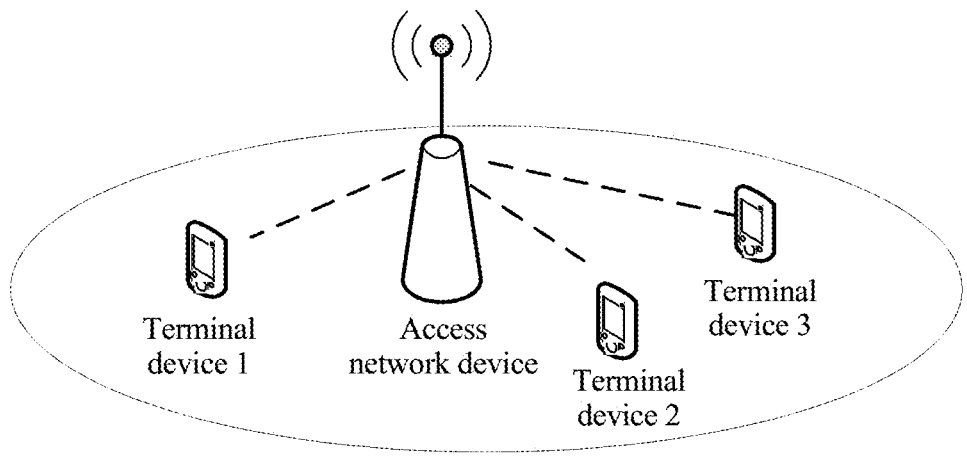
FIG. 1 is a schematic architectural diagram of a communications system according to an embodiment.

A channel state information transmission method in an embodiment may be applied to a schematic architectural diagram of a communications system shown in FIG. 1. The communications system may be applied to an LTE FDD system, or may be applied to a 4.5G communications system or a future 5G communications system. A type of the communications system is not limited in the embodiment of this application. As shown in FIG. 1, the communications system includes an access network device and at least one terminal device. The access network device is located in an access network, and provides a network service for the terminal device covered by the access network. Optionally, the access network device may be a base station, or may be another device that is located in the access network and that can provide an access network service for the terminal device. Optionally, the base station in this application may be a device that communicates with a wireless terminal over an air interface in the access network by using one or more sectors. The base station may be configured to mutually convert a received over-the-air frame and an IP packet and serve as a router between the wireless terminal and a rest portion of the access network, where the rest portion of the access network may include an Internet protocol (IP) network. The base station may coordinate attribute management of the air interface. For example, the base station may be an evolved NodeB (NodeB, eNB, or e-NodeB, evolutional NodeB) in LTE.

In addition, the terminal device in this application may be a wireless terminal device, or may be a wired terminal device. The wireless terminal may be a handheld device having a wireless connection function, or another processing device connected to a wireless modem, or may be a mobile terminal that communicates with one or more core networks through a radio access network. For example, the wireless terminal may be a mobile phone (also referred to as a "cellular" phone) and a computer with a mobile terminal. For another example, the wireless terminal may be alternatively a portable, pocket-sized, handheld, computer built-in, or in-vehicle mobile apparatus.

In a process in which the access network device and the terminal device transmit data or information, the access network device usually needs to learn channel state information (CSI) of downlink information. Therefore, the access network device sends a reference signal to the terminal device. The terminal device performs channel estimation by using the reference signal to obtain CSI of a downlink channel, and feeds back the CSI to the access network device, so that the access network device can perform resource scheduling, data transmission, and the like based on the CSI of the downlink channel. For example, the terminal device sends a PMI to a network device, and the network device selects a corresponding precoding matrix from a codebook based on the PMI, and further precodes to-be-sent downlink data by using the precoding matrix, to improve downlink communication quality. Therefore, accuracy of the CSI fed back by the terminal device affects the downlink communication quality, and how to improve precision of the CSI fed back by the terminal device is particularly important.

A prior method to improve precision of CSI fed back by a terminal device has the terminal device feed back the CSI to a base station by using a two-stage feedback mechanism (W=$W_1 \times W_2$). After receiving a reference signal delivered by an access network device, the terminal device determines a first-stage feedback matrix $W_1$ and a second-stage feedback matrix $W_2$ based on the reference signal. Then the terminal device sends index information of $W_1$ and index information of $W_2$ to the access network device with reference to the first-stage feedback matrix $W_1$ and the second-stage feedback matrix $W_2$. The index information of $W_1$ carries an index of amplitude information or an index of power information of a linear weighted value of each column vector in and an index of each column vector in $W_1$. The index information of $W_2$ carries an index of each element (element) other than a first element in $W_2$. The first element may be an element in a first row in each column of $W_2$. After receiving and obtaining the index information of $W_1$, the base station may obtain non-constant modulus $W_1$, obtain constant modulus $W_2$ based on the index information of $W_2$ and finally obtain a non-constant modulus precoding matrix W, so that the base station can precode to-be-sent downlink data based on W.

However, according to the CSI feedback method, when the terminal device determines that Rank >2, if the terminal device still uses the foregoing feedback manner, feedback overheads are still relatively high. For example, when the terminal device determines that a rank of the precoding matrix is equal to 3, and the precoding matrix includes four rows, and all elements in a first row of $W_2$ are first elements, the index information that is of $W_2$ and that is fed back by the terminal device to the base station includes indexes of nine elements. Alternatively, when the terminal device determines that a rank of the precoding matrix is equal to 4, and the precoding matrix includes four rows, and all elements in a first row of $W_2$ are first elements, the index information that is of $W_2$ and that is fed back by the terminal device to the base station includes indexes of 12 elements. As can be learned, feedback overheads of the terminal device increase as the rank of the precoding matrix increases, leading to a great waste of uplink resources.

The disclosed embodiments provide a channel state information transmission method and an apparatus, to resolve the technical problem in the prior method.

Specific embodiments are used below to describe in detail the technical solutions of this application. The following several specific embodiments may be combined with each other, and a same or similar concept or process may not be described repeatedly in some embodiments.

Figure 2:
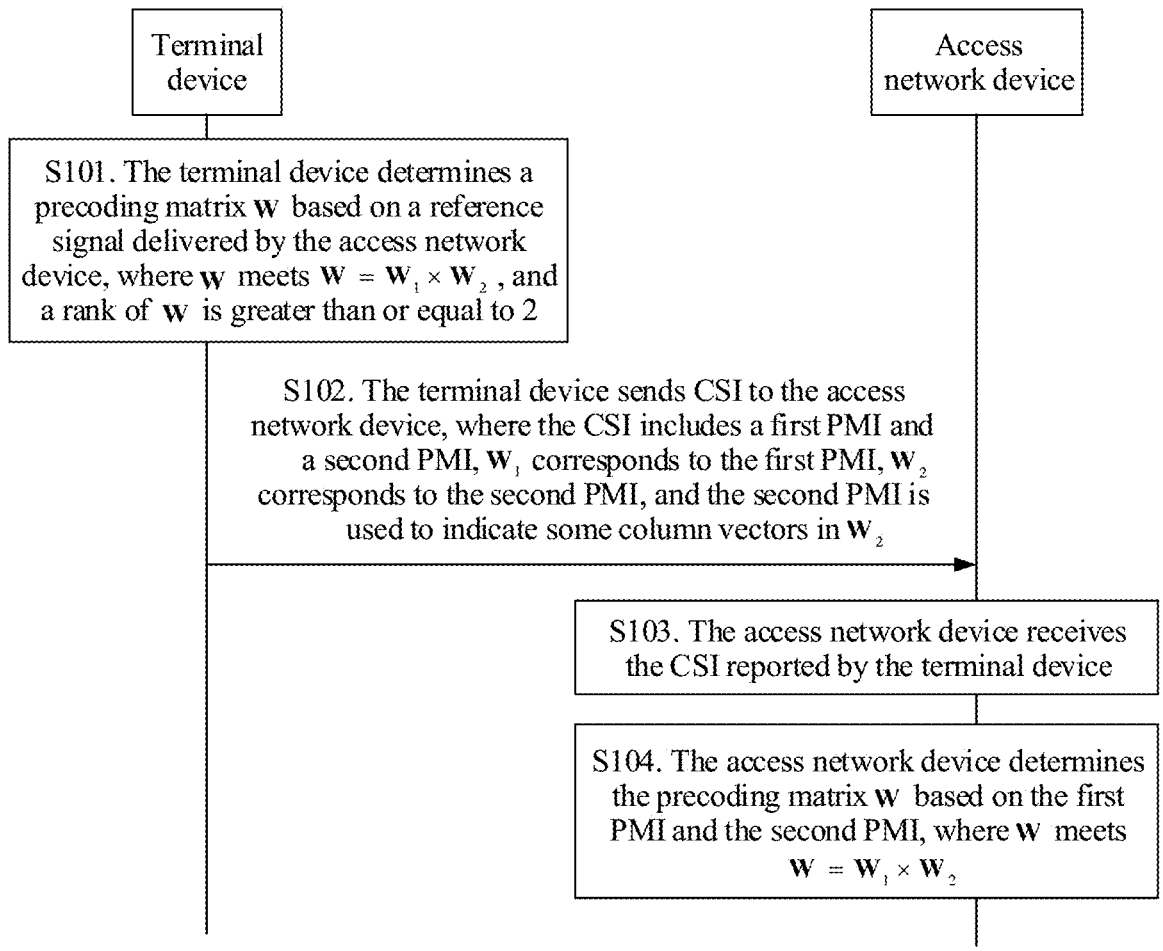
FIG. 2 is a signaling flowchart of a channel state information transmission method according to an embodiment.

FIG. 2 is a schematic signaling flowchart of a channel state information transmission method according to an embodiment. This embodiment involves a specific process in which a terminal device sends, to an access network device, a second PMI used to indicate some column vectors in $W_2$, to reduce overheads of sending, by the terminal device, feedback to the access network device. As shown in FIG. 2, the method includes the following steps.

S101. The terminal device determines a precoding matrix W based on a reference signal delivered by the access network device, where W meets W=$W_1 \times W_2$, and a rank of W is greater than or equal to b 2.

Specifically, when the access network device needs to send downlink data to the terminal device, the access network device pre-sends the reference signal to the terminal device. The terminal device may determine the precoding matrix W based on the reference signal, where W meets W=$W_1 \times W_2$, $W_1$ represents a first-stage feedback matrix, and $W_2$ represents a second-stage feedback matrix. In this embodiment of this application, the rank of the precoding matrix W is greater than or equal to 2. In other words, the rank of the precoding matrix W may be a quantity of columns of W. Correspondingly, in this embodiment of this application, a rank of $W_2$ is also greater than or equal to 2, and is equal to the rank of the precoding matrix W. It should be noted that in this embodiment, the precoding matrix W is a non-constant modulus matrix.

In addition, for a specific process of determining, by the terminal device, the precoding matrix W based on the reference signal, refer to the descriptions in the prior art, and details are not described herein. Optionally, in this embodiment, when determining the precoding matrix W, the terminal device may learn that there is a preset association relationship between some column vectors in $W_2$ constituting W and remaining column vectors in $W_2$. Optionally, the preset association relationship may be pre-agreed on by the terminal device and the access network device, or may be configured by a network device administrator for the terminal device and the network device. The preset association relationship is not limited in this embodiment.

S102. The terminal device sends CSI to the access network device, where the CSI includes a first PMI and a second PMI, $W_1$ corresponds to the first PMI, $W_2$ corresponds to the second PMI, and the second PMI is used to indicate some column vectors in $W_2$.

Specifically, after determining the precoding matrix W, the terminal device may send the CSI to the access network device based on W. Optionally, the terminal device may determine the sent channel state information CSI based on a receiver algorithm such as minimum mean-squared error equalizer (Minimum Mean-Squared Error Equalizer, MMSE for short) and based on throughput maximization, signal to interference plus noise ratio (Signal to Interference plus Noise Ratio, SINR) maximization, or another rule. The first PMI includes an index of amplitude information of a linear weighted value of each column vector in $W_1$ and an index of each column vector in $W_1$. Alternatively, the first PMI may include an index of power information of a linear weighted value of each column vector in $W_1$ and an index of each column vector in $W_1$. Alternatively, the first PMI includes an index of each column vector in $W_1$. Optionally, the second PMI may include an index of a quantized value obtained by quantizing each element other than a first element in the some column vectors, to indicate the some column vectors in $W_2$ to the access network device. Optionally, the second PMI may be alternatively pure identification information, for example, an identification character, and the some column vectors in $W_2$ are notified by using the identification information. How the second PMI indicates the some column vectors in $W_2$ is not limited in this embodiment of this application.

It should be noted that, in this embodiment, when determining that the rank of the precoding matrix W is greater than or equal to 2, the terminal device sends, to the access network device, only the second PMI used to indicate the some column vectors in $W_2$, and does not need to feed back, to the access network device, indexes of quantized values obtained by quantizing all elements in $W_2$. This effectively reduces overheads of feeding back, by the terminal device, the CSI to the access network device, and avoids a waste of uplink resources.

S103. The access network device receives the CSI reported by the terminal device.

S104. The access network device determines the precoding matrix W based on the first PMI and the second PMI, where W meets $W=W_1 \times W_2$.

Specifically, the CSI reported by the terminal device to the access network device includes the first PMI and the second PMI, $W_1$ constituting the precoding matrix W corresponds to the first PMI, and $W_2$ constituting the precoding matrix W corresponds to the second PMI. "Corresponding" herein means that $W_1$ can be determined based on the first PMI, and $W_2$ can be determined based on the second PMI. For example, when receiving the first PMI, the access network device may select, based on the first PMI, $W_1$ from a codebook that is agreed on by the access network device and the terminal device. Optionally, when receiving the second PMI, because the second PMI indicates the some column vectors in $W_2$, the access network device may select, from the codebook agreed on by the access network device and the terminal device, a matrix that meets a format of the some column vectors indicated by the second PMI or meets a size of elements in the some column vectors as $W_2$. Optionally, when the access network device and the terminal device agree on the association relationship between the some column vectors in $W_2$ and the remaining column vectors in $W_2$, after receiving the second PMI, the access network device may learn the some column vectors in $W_2$ based on the second PMI, and then construct the matrix $W_2$ based on the some column vectors and the agreed association relationship. Based on this, the access network device can determine the precoding matrix W based on $W_1$, $W_2$, and $W=W_1 \times W_2$.

As can be learned from the foregoing descriptions, after determining the precoding matrix W ($W=W_1 \times W_2$), the terminal device may send, to the access network device based on W, the CSI including the first PMI and the second PMI, where the second PMI is used to indicate the some column vectors in $W_2$. The access network device may determine, based on the second PMI, $W_2$ from the codebook agreed on by the access network device and the terminal device, determine, based on the first PMI, $W_1$ from the codebook agreed on by the access network device and the terminal device, and further obtain the precoding matrix W. In other words, in this embodiment, when the rank of the precoding matrix W is greater than or equal to 2, the terminal device does not need to report indexes of all elements in $W_2$ to the access network device, and needs to report, to the access network device, only the second PMI used to indicate the some column vectors in $W_2$. This effectively reduces the overheads of feeding back, by the terminal device, the CSI to the access network device, and avoids a waste of uplink resources.

According to the channel state information transmission method provided in this embodiment, after determining, based on the reference signal delivered by the access network device, the precoding matrix W ($W=W_1 \times W_2$) whose rank is greater than or equal to 2, the terminal device sends the CSI including the first PMI and the second PMI to the access network device, where the second PMI is used to indicate the some column vectors in $W_2$, so that the access network device obtains the precoding matrix W based on the first PMI and the second PMI. In other words, in this embodiment, when the rank of the precoding matrix W is greater than or equal to 2, the terminal device does not need to report the indexes of all elements in $W_2$ to the access network device, and needs to report, to the access network device, only the second PMI used to indicate the some column vectors in $W_2$. This effectively reduces the overheads of feeding back, by the terminal device, the CSI to the access network device, and avoids a waste of uplink resources. In addition, the precoding matrix W determined in this embodiment is a non-constant modulus matrix. Compared with a constant modulus precoding matrix determined by an access network device in Rel13 and a release earlier than Rel13, precision of the precoding matrix is greatly improved.

Optionally, in a first implementation of this embodiment, this implementation involves specific content of the second PMI that is sent by the terminal device to the access network device based on the association relationship that is between the some column vectors in $W_2$ and the remaining column vectors and that is pre-agreed on by the terminal device and the access network device. Based on the foregoing embodiment, the second PMI may include an index of a quantized value obtained by quantizing each element other than the first element in $$\left\lceil \frac{N}{2} \right\rceil$$

columns of column vectors in $W_2$, where there is a preset association relationship between $$N - \left\lceil \frac{N}{2} \right\rceil$$

remaining column vectors in $W_2$ and the $$\left\lceil \frac{N}{2} \right\rceil$$

columns of column vectors, N is a quantity of columns of $W_2$, the rank of $W_2$ is greater than or equal to 2, that is, N is a positive integer greater than or equal to 2, and the first element is an element that remains unchanged in the $$\left\lceil \frac{N}{2} \right\rceil$$

columns of column vectors. Optionally, the first element is an element in a first row in each of the $$\left\lceil \frac{N}{2} \right\rceil$$

columns of column vectors in $W_2$. Optionally, the element in the first row may be 1.

Specifically, in this implementation, it is assumed that $W_2$ represents a matrix including N columns. A quantity of rows of $W_2$ is not limited in this implementation. After determining the precoding matrix W, the terminal device sends the first PMI and the second PMI to the access network device with reference to W. The first PMI includes an index of amplitude information of a linear weighted value of each column vector in $W_1$ and an index of each column vector in $W_1$, or the first PMI may include an index of power information of a linear weighted value of each column vector in $W_1$ and an index of each column vector in $W_1$. The second PMI may include the index of the quantized value obtained by quantizing each element other than the first element in the $$\left\lceil \frac{N}{2} \right\rceil$$

columns of column vectors in $W_2$. In $W_2$ determined by the terminal device, there is the preset association relationship between the $$N - \left\lceil \frac{N}{2} \right\rceil$$

remaining column vectors and the $$\left\lceil \frac{N}{2} \right\rceil$$

columns of column vectors. It should be noted that in this implementation, the terminal device and the access network device pre-agree on the association relationship between the $$N - \left\lceil \frac{N}{2} \right\rceil$$

remaining column vectors in $W_2$ and the $$\left\lceil \frac{N}{2} \right\rceil$$

columns of column vectors. Therefore, when the terminal device reports the first PMI and the second PMI to the access network device, the access network device only needs to determine the $$\left\lceil \frac{N}{2} \right\rceil$$

columns of column vectors based on the content included in the second PMI, and then select, from the codebook based on the association relationship learned by the access network device, a matrix meeting the association relationship as $W_2$. Optionally, the access network device may alternatively directly construct $W_2$ based on the $$\left\lceil \frac{N}{2} \right\rceil$$

columns of column vectors and the association relationship.
Optionally, the $$\left\lceil \frac{N}{2} \right\rceil$$

columns of column vectors indicated in the second PMI may be any $$\left\lceil \frac{N}{2} \right\rceil$$

columns of column vectors, for example, may be the first $$\left\lceil \frac{N}{2} \right\rceil$$

columns of column vectors, or may be $$\left\lceil \frac{N}{2} \right\rceil$$

columns of column vectors in the middle. This is not limited in this implementation. Optionally, the second PMI may specifically include an index of a quantized value obtained by quantizing each element other than the first element in the first columns of column vectors in $W_2$ where there is a preset association relationship between $$N - \left\lceil \frac{N}{2} \right\rceil$$

remaining column vectors in $W_2$ and the first $$\left\lceil \frac{N}{2} \right\rceil$$

columns of column vectors. In the optional manner, the access network device and the terminal device pre-agree on the association relationship between the $$N - \left\lceil \frac{N}{2} \right\rceil$$

remaining column vectors in $W_2$ and the first $$\left\lceil \frac{N}{2} \right\rceil$$

columns of column vectors. In this way, after receiving the second PMI reported by the terminal device, the access network device may determine the first $$\left\lceil \frac{N}{2} \right\rceil$$

columns of column vectors in $W_2$ based on the index that is of the quantized value obtained by quantizing each element other than the first element in the first $$\left\lceil \frac{N}{2} \right\rceil$$

columns of column vectors in $W_2$ and that is indicated in the second PMI, and then determine $W_2$ based on the association relationship that is between the $$N - \left\lceil \frac{N}{2} \right\rceil$$

remaining column vectors in $W_2$ and the first $$\left\lceil \frac{N}{2} \right\rceil$$

columns of column vectors and that is learned by the access network device. Optionally, the access network device may determine the $$N - \left\lceil \frac{N}{2} \right\rceil$$

remaining column vectors in $W_2$ based on the association relationship between the $$N - \left\lceil \frac{N}{2} \right\rceil$$

remaining column vectors in $W_2$ and the first $$\left\lceil \frac{N}{2} \right\rceil$$

columns of column vectors, and then obtain $W_2$ with reference to the determined first $$\left\lceil \frac{N}{2} \right\rceil$$

columns of column vectors. Alternatively, the access network device may select a matrix from the codebook as $W_2$ based on the determined first $$\left\lceil \frac{N}{2} \right\rceil$$

columns of column vectors and the learned association relationship, where the matrix meets the following conditions: the matrix includes N columns, the first $$\left\lceil \frac{N}{2} \right\rceil$$

columns of column vectors in the matrix are the same as the first $$\left\lceil \frac{N}{2} \right\rceil$$

columns of column vectors indicated in the second PMI, and an association relationship between $$N - \left\lceil \frac{N}{2} \right\rceil$$

remaining column vectors in the matrix and the first $$\left\lceil \frac{N}{2} \right\rceil$$

columns of column vectors meets the association relationship learned by the access network device.

In addition, the access network device selects, from the codebook agreed on by the access network device and the terminal device, a matrix corresponding to the first PMI as $W_1$ based on the first PMI. Therefore, the precoding matrix W obtained by the access network device based on $W_1$ and $W_2$ is a non-constant modulus matrix. Compared with a precoding matrix determined by an access network device in Rel13 and a release earlier than Rel13, precision of the precoding matrix is greatly improved.

In the first implementation, when the terminal device and the access network device pre-agree on the association relationship between the $$\lceil \frac{N}{2} \rceil$$

remaining column vectors in $W_2$ and the $$N - \lceil \frac{N}{2} \rceil$$

columns of column vectors indicated in the second PMI, the terminal device reports, to the access network device, the second PMI that includes the index of the quantized value obtained by quantizing each element other than the first element in the $$\lceil \frac{N}{2} \rceil$$

columns of column vectors in $W_2$. The access network device may determine $W_2$ based on the second PMI and the association relationship learned by the access network device, and further determine the precoding matrix W. In this implementation, when the quantity of columns of $W_2$ is greater than or equal to 2, the second PMI reported by the terminal device to the access network device does not need to include an index of a quantized value obtained by quantizing each element in $W_2$, and needs to include only the index of the quantized value obtained by quantizing each element other than the first element in the $$\lceil \frac{N}{2} \rceil$$

columns of column vectors in $W_2$. This reduces overheads of reporting, by the terminal device, the CSI to the access network device. In addition, because the terminal device and the access network device pre-agree on the association relationship, the terminal device does not need to add the association relationship to the second PMI. This further reduces feedback overheads of the terminal device, and avoids a waste of uplink resources.

Optionally, in a second implementation of this embodiment, this implementation involves specific content of the second PMI that is sent by the terminal device to the access network device when the terminal device and the access network device do no pre-agree on the association relationship between the some column vectors in $W_2$ and the remaining column vectors. Based on the foregoing Embodiment 1, in addition to indicating the some column vectors in $W_2$ to the access network device, the second PMI is further used to indicate the association relationship between the some column vectors and the remaining column vectors other than the some column vectors in $W_2$ to the access network device.

In the second implementation, as described in the foregoing embodiment and implementation, the second PMI may include the index of the quantized value obtained by quantizing each element other than the first element in the some column vectors, to indicate the some column vectors in $W_2$ to the access network device. Optionally, the second PMI may be alternatively pure identification information, for example, an identification character, and the some column vectors in $W_2$ are notified by using the identification information. Optionally, the second PMI may alternatively indicate amplitudes and phases of elements in the remaining column vectors in $W_2$ to the access network device based on locations of elements in the some known column vectors in $W_2$ and with reference to amplitude information and phase information of the known elements. Alternatively, the second PMI may indicate, by using a corresponding identifier such as 00, that an amplitude and a phase of an unknown element are the same as an amplitude and a phase of a known element in the some column vectors, or may indicate, by using a corresponding identifier such as 01, that an unknown element and a known element that is in the some column vectors have a same amplitude but have different phases that differ from each other by 90 degrees, or the like. Specific manners of indicating, by the second PMI, the some column vectors in $W_2$ and indicating the association relationship between the some column vectors and the remaining column vectors in $W_2$ are not limited in this implementation.

Further, with reference to the second possible implementation, optionally, the second PMI may specifically include an index of a quantized value obtained by quantizing each element other than the first element in $$\lceil \frac{N}{2} \rceil$$

columns of column vectors in $W_2$ and a relationship between $$N - \lceil \frac{N}{2} \rceil$$

remaining column vectors in $W_2$ and the $$\lceil \frac{N}{2} \rceil$$

columns of column vectors, where N is a quantity of columns of $W_2$.

Specifically, in this implementation, the terminal device and the access network device do not pre-agree on an association relationship between column vectors in $W_2$. After determining the precoding matrix W, the terminal device sends the second PMI to the access network device. The second PMI includes the index of the quantized value obtained by quantizing each element other than the first element in the $$\lceil \frac{N}{2} \rceil$$

columns of column vectors in $W_2$ and the relationship between the $$N - \left\lceil \frac{N}{2} \right\rceil$$

remaining column vectors in $W_2$ and the $$\left\lceil \frac{N}{2} \right\rceil$$

columns of column vectors. In this case, after receiving the second PMI reported by the terminal device, the access network device may determine $$\left\lceil \frac{N}{2} \right\rceil$$

the columns of column vectors in $W_2$ based on the index of the quantized value obtained by quantizing each element other than the first element in the $$\left\lceil \frac{N}{2} \right\rceil$$

columns of column vectors in $W_2$ in the second PMI, then construct the $$N - \left\lceil \frac{N}{2} \right\rceil$$

remaining column vectors based on the relationship that is between the $$N - \left\lceil \frac{N}{2} \right\rceil$$

remaining column vectors in $W_2$ and the $$\left\lceil \frac{N}{2} \right\rceil$$

columns of column vectors and that is included in the second PMI, and further determine $W_2$. Optionally, after determining the $$\left\lceil \frac{N}{2} \right\rceil$$

columns of column vectors in $W_2$, the access network device may select a matrix from the codebook as $W_2$, where the matrix meets the following conditions: the matrix includes N columns and the $$\left\lceil \frac{N}{2} \right\rceil$$

columns of column vectors, and an association relationship between $$N - \left\lceil \frac{N}{2} \right\rceil$$

remaining column vectors in the matrix and the $$\left\lceil \frac{N}{2} \right\rceil$$

columns of column vectors meets the indication of the second PMI. A specific manner of determining, by the access network device, $W_2$ based on the second PMI is not limited in this embodiment. Optionally, in this implementation, a side of the access network device may include association relationships between column vectors in different $W_2$. An association relationship selected by the access network device to determine $W_2$ is related to the association relationship that is indicated in the second PMI reported by a side of the terminal device.

Optionally, the $$\left\lceil \frac{N}{2} \right\rceil$$

columns of column vectors indicated in the second PMI may be any $$\left\lceil \frac{N}{2} \right\rceil$$

columns of column vectors, for example, may be the first $$\left\lceil \frac{N}{2} \right\rceil$$

columns of column vectors, or may be $$\left\lceil \frac{N}{2} \right\rceil$$

columns of column vectors in the middle. This is not limited in this implementation. Optionally, the second PMI may specifically include an index of a quantized value obtained by quantizing each element other than the first element in the first $$\left\lceil \frac{N}{2} \right\rceil$$

columns of column vectors in $W_2$ and the association relationship between the $N - \lceil \frac{N}{2} \rceil$ remaining column vectors in $W_2$ and the first $\lceil \frac{N}{2} \rceil$ columns of column vectors. In this optional manner, after receiving the second PMI reported by the terminal device, the access network device may determine the first $\lceil \frac{N}{2} \rceil$ columns of column vectors in $W_2$ based on the index that is of the quantized value obtained by quantizing each element other than the first element in the first $\lceil \frac{N}{2} \rceil$ columns of column vectors in $W_2$ and that is indicated in the second PMI, and then determine $W_2$ based on the association relationship that is between the $N - \lceil \frac{N}{2} \rceil$ remaining column vectors in $W_2$ and the first $\lceil \frac{N}{2} \rceil$ columns of column vectors and that is indicated in the second PMI. Optionally, the access network device may determine the $N - \lceil \frac{N}{2} \rceil$ remaining column vectors in $W_2$ based on the association relationship between the $N - \lceil \frac{N}{2} \rceil$ remaining column vectors in $W_2$ and the first $\lceil \frac{N}{2} \rceil$ columns of column vectors, and then obtain $W_2$ with reference to the determined first $\lceil \frac{N}{2} \rceil$ columns of column vectors. Alternatively, the access network device may select a matrix from the codebook as $W_2$ based on the determined first $\lceil \frac{N}{2} \rceil$ columns of column vectors and the association relationship indicated in the second PMI, where the matrix meets the following conditions: the matrix includes N columns, the first $\lceil \frac{N}{2} \rceil$ columns of column vectors in the matrix are the same as the first $\lceil \frac{N}{2} \rceil$ columns of column vectors indicated in the second PMI, and an association relationship between $N - \lceil \frac{N}{2} \rceil$ remaining column vectors in the matrix and the first $\lceil \frac{N}{2} \rceil$ columns of column vectors meets the association relationship indicated in the second PMI.

In addition, the access network device selects, from the codebook agreed on by the access network device and the terminal device, a matrix corresponding to the first PMI as $W_1$ based on the first PMI. Therefore, the precoding matrix W obtained by the access network device based on $W_1$ and $W_2$ is a non-constant modulus matrix. Compared with a precoding matrix determined by an access network device in Rel13 and a release earlier than Rel13, precision of the precoding matrix is greatly improved.

In the second implementation, when the terminal device and the access network device do not pre-agree on the association relationship between the some column vectors in $W_2$ and the remaining column vectors, the second PMI reported by the terminal device to the access network device includes the index of the quantized value obtained by quantizing each element other than the first element in the $\lceil \frac{N}{2} \rceil$ columns of column vectors in $W_2$, and the relationship between the $$N - \left\lceil \frac{N}{2} \right\rceil$$

remaining column vectors in $W_2$ and the $$\left\lceil \frac{N}{2} \right\rceil$$

columns of column vectors, so that the access network device can determine $W_2$ based on the second PMI, and further determine the precoding matrix W. In this implementation, when a quantity of columns of $W_2$ is greater than or equal to 2, the second PMI reported by the terminal device to the access network device does not need to include an index of a quantized value obtained by quantizing each element in $W_2$. This reduces feedback overheads of reporting, by the terminal device, the CSI to the access network device. In addition, the precoding matrix determined by the access network device is a non-constant modulus matrix. This improves CSI feedback precision.

Further, as can be learned with reference to the first implementation and the second implementation, there is the association relationship between $$N - \left\lceil \frac{N}{2} \right\rceil$$

remaining column vectors in $W_2$ and the first $$\left\lceil \frac{N}{2} \right\rceil$$

columns of column vectors. Therefore, in a third possible implementation of this embodiment of this application, this implementation involves specific content of the association relationship between the $$N - \left\lceil \frac{N}{2} \right\rceil$$

remaining column vectors in $W_2$ and the first $$\left\lceil \frac{N}{2} \right\rceil$$

columns of column vectors. Based on the foregoing embodiment, the association relationship between the $$N - \left\lceil \frac{N}{2} \right\rceil$$

remaining column vectors in $W_2$ and the first $$\left\lceil \frac{N}{2} \right\rceil$$

columns of column vectors specifically includes a phase association relationship between elements in a column vector in a $$\left( k + \left\lceil \frac{N}{2} \right\rceil \right)^{th}$$

column of $W_2$ and elements in a column vector in a $k^{th}$ column of $W_2$, where k is a positive integer in $$\left[ 1, \left\lceil \frac{N}{2} \right\rceil \right].$$

Specifically, in this implementation, there is the phase association relationship between the elements in the column vector in the $$\left( k + \left\lceil \frac{N}{2} \right\rceil \right)^{th}$$

column of $W_2$ and the elements in the column vector in the $k^{th}$ column of $W_2$. For example, when the quantity of columns of $W_2$ is 3, the first $$\left\lceil \frac{N}{2} \right\rceil$$

columns of column vectors in $W_2$ are the first two column vectors in $W_2$, the $$N - \left\lceil \frac{N}{2} \right\rceil$$

remaining column vectors in $W_2$ are a column vector in a third column of $W_2$, and a value of k is 1. There is a phase association relationship between elements in a column vector in a third column of $W_2$ and elements in a column vector in a first column of $W_2$. For another example, when the quantity of columns of $W_2$ is 4, the first $$\left\lceil \frac{N}{2} \right\rceil$$

columns of column vectors in $W_2$ are the first two columns of column vectors in $W_2$, the $$N - \left\lceil \frac{N}{2} \right\rceil$$

remaining column vectors in $W_2$ are a column vector in a third column and a column vector in a fourth column of $W_2$, and values of k are 1 and 2. In other words, there is a phase association relationship between elements in the column vector in the third column of $W_2$ and elements in a column vector in a first column of $W_2$, and there is a phase association relationship between elements in the column vector in the fourth column of $W_2$ and elements in a column vector in a second column of $W_2$.

Optionally, the phase association relationship between the elements in the column vector in the $$(k+\lceil\tfrac{N}{2}\rceil)^{th}$$

column of $W_2$ and the elements in the column vector in the $k^{th}$ column of $W_2$ may be, for example, that an element in the column vector in the $$(k+\lceil\tfrac{N}{2}\rceil)^{th}$$

column of $W_2$ is obtained by rotating a phase of an element in the column vector in the $k^{th}$ column by an angle. Optionally, when $W_2$ represents a matrix including M rows and N columns, where M is an even number, the phase association relationship between the elements in the column vector in the $$(k+\lceil\tfrac{N}{2}\rceil)^{th}$$

column of $W_2$ and the elements in the column vector in the $k^{th}$ column may be specifically $$c_{m,(k+\lceil\tfrac{N}{2}\rceil)} = a_m * c_{m,k},$$

where $c_{m,k}$ represents an element in an $m^{th}$ row and the $k^{th}$ column of $W_2$, $$c_{m,(k+\lceil\tfrac{N}{2}\rceil)}$$

represents an element in the $m^{th}$ row and the $$(k+\lceil\tfrac{N}{2}\rceil)^{th}$$

column of $W_2$, $$a_p * conj(a_{p+\tfrac{M}{2}}) = -1,$$

m is a positive integer in [1, M], p is a positive integer in $$[1, \tfrac{M}{2}],$$

and $a_1, a_2, \ldots, a_m$ are not completely the same.

Specifically, in this optional implementation, $c_{m,k}$ has phase information, $$c_{m,(k+\lceil\tfrac{N}{2}\rceil)}$$

also has phase information, and there is a phase difference between $c_{m,k}$ and $$c_{m,(k+\lceil\tfrac{N}{2}\rceil)}.$$

The phase difference may be reflected by using a coefficient, and the coefficient is $\alpha_m$. For example, when the phase difference between $c_{m,k}$ and $$c_{m,(k+\lceil\tfrac{N}{2}\rceil)}$$

is 90 degrees, $\alpha_m$ is equal to j, or when the phase difference between $c_{m,k}$ and $$c_{m,(k+\lceil\tfrac{N}{2}\rceil)}$$

and is 180 degrees, $\alpha_m$ is equal to −1. Certainly, when the phase difference between $c_{m,k}$ and $$c_{m,(k+\lceil\tfrac{N}{2}\rceil)}$$

is another angle, $\alpha_m$ is equal to another value. A value of $\alpha_m$ is not limited in this embodiment provided that $$a_p * conj(a_{p+\tfrac{M}{2}}) = -1 \text{ or } a_p + a_{p+\tfrac{M}{2}} = 0,$$

where $\alpha_p$ is a coefficient corresponding to a phase difference between an element in the $$(k+\lceil\tfrac{N}{2}\rceil)^{th}$$

column and a $p^{th}$ row of $W_2$ and an element in the $k^{th}$ column and the $p^{th}$ row of $W_2$, $$a_{p+\tfrac{M}{2}}$$

is a coefficient corresponding to a phase difference between an element in the $$(k+\lceil\tfrac{N}{2}\rceil)^{th}$$

column and a $$\left(p+\frac{M}{2}\right)^{th}$$

and a row of $W_2$ and an element in the $k^{th}$ column and the $$\left(p+\frac{M}{2}\right)^{th}$$

row of $W_2$. In other words, for the $$\left(k+\left\lceil\frac{N}{2}\right\rceil\right)^{th}$$

column, the corresponding $a_1, a_2, \ldots, a_m$ are not completely the same. To be specific, coefficients corresponding to phase differences between elements in the $$\left(k+\left\lceil\frac{N}{2}\right\rceil\right)^{th}$$

column and corresponding elements in the $k^{th}$ column are not completely the same.

Optionally, $\alpha_m \in \{1,-1, j,-j\}$. To be specific, the phase difference between $c_{m,k}$ and $$c_{m,(k+\lceil\frac{N}{2}\rceil)}$$

may be 90 degrees, 180 degrees, 270 degrees, or 0 degrees. When the phase difference between $c_{m,k}$ and $$c_{m,(k+\lceil\frac{N}{2}\rceil)}$$

is 90 degrees, $\alpha_m$ is equal to j. When the phase difference between $c_{m,k}$ and $$c_{m,(k+\lceil\frac{N}{2}\rceil)}$$

is 180 degrees, $\alpha_m$ is equal to $-1$. When the phase difference between $c_{m,k}$ and $$c_{m,(k+\lceil\frac{N}{2}\rceil)}$$

is 270 degrees, $\alpha_m$ is equal to $-j$. When the phase difference between $c_{m,k}$ and $$c_{m,(k+\lceil\frac{N}{2}\rceil)}$$

is 0 degrees, $\alpha_m$ is equal to 1.

Therefore, after the terminal device and the access network device pre-agree on an association relationship between $$c_{m,(k+\lceil\frac{N}{2}\rceil)} = a_m * c_{m,k} \text{ and } a_p * conj\left(a_{p+\frac{M}{2}}\right) = -1,$$

the terminal device reports the second PMI to the access network device, where the second PMI includes the index of the quantized value obtained by quantizing each element other than the first element in the first $$\left\lceil\frac{N}{2}\right\rceil$$

columns of column vectors in $W_2$. The access network device can determine $W_2$ based on the second PMI and the pre-agreed association relationship. When the terminal device and the access network device do not pre-agree on the association relationship between $$c_{m,(k+\lceil\frac{N}{2}\rceil)} = a_m * c_{m,k} \text{ and } a_p * conj\left(a_{p+\frac{M}{2}}\right) = -1,$$

after determining the precoding matrix W with reference to the reference signal delivered by the access network device, the terminal device reports the second PMI to the access network device, where the second PMI includes the association relationship between $$c_{m,(k+\lceil\frac{N}{2}\rceil)} = a_m * c_{m,k} \text{ and } a_p * conj\left(a_{p+\frac{M}{2}}\right) = -1,$$

and further includes the index of the quantized value obtained by quantizing each element other than the first element in the first $$\left\lceil\frac{N}{2}\right\rceil$$

columns of column vectors in $W_2$. Therefore, the access network device can determine $W_2$ with reference to the second PMI.

To more clearly describe the phase association relationship between the elements in the column vector in the $$\left(k+\left\lceil\frac{N}{2}\right\rceil\right)^{th}$$

column of $W_2$ and the elements in the column vector in the $k^{th}$ column of $W_2$ in this embodiment of this application, specific descriptions are provided herein with reference to $$c_{m,(k+\lceil\frac{N}{2}\rceil)} = a_m * c_{m,k}$$

and by using an example in which $W_2$ represents a matrix including four rows and three columns (M=4, N=3) and a matrix including four rows and four columns (M=4, N=3).

(1) When $W_2$ represents a matrix including four rows and three columns (M=4, N=3), the phase association relationship between the elements in the column vector in the $$\left(k+\left\lceil\frac{N}{2}\right\rceil\right)^{th}$$

column of $W_2$ and the elements in the column vector in the $k^{th}$ column of $W_2$ may be specifically any one of the following association relationships: A, B, C, and D.

A: Elements in the first two rows of a column vector in a third column of $W_2$ are the same as elements in the first two rows of a column vector in a first column of $W_2$. Elements in the last two rows of the column vector in the third column of $W_2$ are values obtained by rotating phases of elements in the last two rows of the column vector in the first column by 180 degrees. Optionally, $W_2$ may be specifically $$W_2 = \begin{bmatrix} c_{1,0} & c_{2,0} & c_{1,0} \\ c_{1,1} & c_{2,1} & c_{1,1} \\ c_{1,2} & c_{2,2} & -c_{1,2} \\ c_{1,3} & c_{2,3} & -c_{1,3} \end{bmatrix}.$$

B: Elements in a first row and a fourth row of the column vector in the third column of $W_2$ are respectively the same as elements in a first row and a fourth row of the column vector in the first column of $W_2$. Elements in a second row and a third row of the column vector in the third column of $W_2$ are respectively values obtained by rotating phases of elements in a second row and a third row of the column vector in the first column of $W_2$ by 180 degrees. Optionally, $W_2$ may be specifically $$W_2 = \begin{bmatrix} c_{1,0} & c_{2,0} & c_{1,0} \\ c_{1,1} & c_{2,1} & -c_{1,1} \\ c_{1,2} & c_{2,2} & -c_{1,2} \\ c_{1,3} & c_{2,3} & c_{1,3} \end{bmatrix}.$$

C: The element in the first row of the column vector in the third column of $W_2$ is the same as the element in the first row of the column vector in the first column of $W_2$. The element in the second row of the column vector in the third column of $W_2$ is a value obtained by rotating the element in the second row of the column vector in the first column of $W_2$ by 90 degrees. The element in the third row of the column vector in the third column of $W_2$ is a value obtained by rotating the element in the third row of the column vector in the first column of $W_2$ by 180 degrees. The element in the fourth row of the column vector in the third column of $W_2$ is a value obtained by rotating the element in the fourth row of the column vector in the first column of $W_2$ by 270 degrees. Optionally, $W_2$ may be specifically $$W_2 = \begin{bmatrix} c_{1,0} & c_{2,0} & c_{1,0} \\ c_{1,1} & c_{2,1} & jc_{1,1} \\ c_{1,2} & c_{2,2} & -c_{1,2} \\ c_{1,3} & c_{2,3} & -jc_{1,3} \end{bmatrix}.$$

D: The element in the first row of the column vector in the third column of $W_2$ is the same as the element in the first row of the column vector in the first column of $W_2$. The element in the second row of the column vector in the third column of $W_2$ is a value obtained by rotating the element in the second row of the column vector in the first column of $W_2$ by 270 degrees. The element in the third row of the column vector in the third column of $W_2$ is a value obtained by rotating the element in the third row of the column vector in the first column of $W_2$ by 180 degrees. The element in the fourth row of the column vector in the third column of $W_2$ is a value obtained by rotating the element in the fourth row of the column vector in the first column of $W_2$ by 90 degrees. Optionally, $W_2$ may be specifically $$W_2 = \begin{bmatrix} c_{1,0} & c_{2,0} & c_{1,0} \\ c_{1,1} & c_{2,1} & -jc_{1,1} \\ c_{1,2} & c_{2,2} & -c_{1,2} \\ c_{1,3} & c_{2,3} & jc_{1,3} \end{bmatrix}.$$

(2) When $W_2$ represents a matrix including four rows and four columns (M=4, N=4), the phase association relationship between the elements in the column vector in the $$\left(k+\left\lceil\frac{N}{2}\right\rceil\right)^{th}$$

column of $W_2$ and the elements in the column vector in the $k^{th}$ column of $W_2$ may be specifically any one of the following association relationships: E, F, G, and H.

E: Elements in the first two rows of a column vector in a third column of $W_2$ are the same as elements in the first two rows of a column vector in a first column of $W_2$. Elements in the first two rows of a column vector in a fourth column of $W_2$ are the same as elements in the first two rows of a column vector in a second column of $W_2$. Elements in the last two rows of the column vector in the third column of $W_2$ are values obtained by rotating phases of elements in the last two rows of the column vector in the first column of $W_2$ by 180 degrees. Elements in the last two rows of the column vector in the fourth column of $W_2$ are values obtained by rotating phases of elements in the last two rows of the column vector in the second column of $W_2$ by 180 degrees. Optionally, $W_2$ may be specifically $$W_2 = \begin{bmatrix} c_{1,0} & c_{2,0} & c_{1,0} & c_{2,0} \\ c_{1,1} & c_{2,1} & c_{1,1} & c_{2,1} \\ c_{1,2} & c_{2,2} & -c_{1,2} & -c_{2,2} \\ c_{1,3} & c_{2,3} & -c_{1,3} & -c_{2,3} \end{bmatrix}.$$

F: Elements in a first row and a fourth row of the column vector in the third column of $W_2$ are the same as elements in a first row and a fourth row of the column vector in the first column of $W_2$. Elements in a first row and a fourth row of the column vector in the fourth column of $W_2$ are the same as elements in a first row and a fourth row of the column vector in the second column of $W_2$. Elements in a second row and a third row of the column vector in the third column of $W_2$ are values obtained by rotating phases of elements in a second row and a third row of the column vector in the first column of $W_2$ by 180 degrees. Elements in a second row and a third row of the column vector in the fourth column of $W_2$ are values obtained by rotating phases of elements in a second row and a third row of the column vector in the second column of $W_2$ by 180 degrees. Optionally, $W_2$ may be specifically $$W_2 = \begin{bmatrix} c_{1,0} & c_{2,0} & c_{1,0} & c_{2,0} \\ c_{1,1} & c_{2,1} & -c_{1,1} & -c_{2,1} \\ c_{1,2} & c_{2,2} & -c_{1,2} & -c_{2,2} \\ c_{1,3} & c_{2,3} & c_{1,3} & c_{2,3} \end{bmatrix}.$$

G: The element in the first row of the column vector in the third column of $W_2$ is the same as the element in the first row of the column vector in the first column of $W_2$. The element in the second row of the column vector in the third column of $W_2$ is a value obtained by rotating the element in the second row of the column vector in the first column of $W_2$ by 90 degrees. The element in the third row of the column vector in the third column of $W_2$ is a value obtained by rotating the element in the third row of the column vector in the first column of $W_2$ by 180 degrees. The element in the fourth row of the column vector in the third column of $W_2$ is a value obtained by rotating the element in the fourth row of the column vector in the first column of $W_2$ by 270 degrees. The element in the first row of the column vector in the fourth column of $W_2$ is the same as the element in the first row of the column vector in the second column of $W_2$. The element in the second row of the column vector in the fourth column of $W_2$ is a value obtained by rotating the element in the second row of the column vector in the second column of $W_2$ by 90 degrees. The element in the third row of the column vector in the fourth column of $W_2$ is a value obtained by rotating the element in the third row of the column vector in the second column of $W_2$ by 180 degrees. The element in the fourth row of the column vector in the fourth column of $W_2$ is a value obtained by rotating the element in the fourth row of the column vector in the second column of $W_2$ by 270 degrees. Optionally, $W_2$ may be specifically $$W_2 = \begin{bmatrix} c_{1,0} & c_{2,0} & c_{1,0} & c_{2,0} \\ c_{1,1} & c_{2,1} & jc_{1,1} & jc_{2,1} \\ c_{1,2} & c_{2,2} & -c_{1,2} & -c_{2,2} \\ c_{1,3} & c_{2,3} & -jc_{1,3} & -jc_{2,3} \end{bmatrix}.$$

H: The element in the first row of the column vector in the third column of $W_2$ is the same as the element in the first row of the column vector in the first column of $W_2$. The element in the second row of the column vector in the third column of $W_2$ is a value obtained by rotating the element in the second row of the column vector in the first column of $W_2$ by 270 degrees. The element in the third row of the column vector in the third column of $W_2$ is a value obtained by rotating the element in the third row of the column vector in the first column of $W_2$ by 180 degrees. The element in the fourth row of the column vector in the third column of $W_2$ is a value obtained by rotating the element in the fourth row of the column vector in the first column of $W_2$ by 90 degrees. The element in the first row of the column vector in the fourth column of $W_2$ is the same as the element in the first row of the column vector in the second column of $W_2$. The element in the second row of the column vector in the fourth column of $W_2$ is a value obtained by rotating the element in the second row of the column vector in the second column of $W_2$ by 270 degrees. The element in the third row of the column vector in the fourth column of $W_2$ is a value obtained by rotating the element in the third row of the column vector in the second column of $W_2$ by 180 degrees. The element in the fourth row of the column vector in the fourth column of $W_2$ is a value obtained by rotating the element in the fourth row of the column vector in the second column of $W_2$ by 90 degrees. Optionally, $W_2$ may be specifically $$W_2 = \begin{bmatrix} c_{1,0} & c_{2,0} & c_{1,0} & c_{2,0} \\ c_{1,1} & c_{2,1} & -jc_{1,1} & -jc_{2,1} \\ c_{1,2} & c_{2,2} & -c_{1,2} & -c_{2,2} \\ c_{1,3} & c_{2,3} & jc_{1,3} & jc_{2,3} \end{bmatrix}.$$

Optionally, when $W_2$ represents a matrix including six rows and three columns, $W_2$ may be $$W_2 = \begin{bmatrix} c_{1,1} & c_{2,1} & c_{1,1} \\ c_{1,2} & c_{2,2} & jc_{1,2} \\ c_{1,3} & c_{2,3} & -c_{1,3} \\ c_{1,4} & c_{2,4} & -c_{1,4} \\ c_{1,5} & c_{2,5} & -jc_{1,5} \\ c_{1,6} & c_{2,6} & c_{1,6} \end{bmatrix}$$

based on the association relationship between $$c_{m,(k+\lceil \frac{N}{2} \rceil)} = a_m * c_{m,k} \text{ and } a_p * conj\left(a_{p+\frac{M}{2}}\right) = -1.$$

To sum up, in the third implementation, when the quantity of columns of $W_2$ is greater than or equal to 2, that is, when the rank of W is greater than or equal to 2, the terminal device may report, to the access network device, the index of the quantized value obtained by quantizing each element other than the first element in the first $$\left\lceil \frac{N}{2} \right\rceil$$

columns of column vectors in $W_2$, so that the access network device determines $W_2$ based on the pre-known association relationship between the $$N - \left\lceil \frac{N}{2} \right\rceil$$

remaining column vectors in $W_2$ and the first $$\left\lceil \frac{N}{2} \right\rceil$$

columns of column vectors or the association relationship indicated in the second PMI, further determines $W_1$ based on the first PMI reported by the terminal device, and obtains the precoding matrix W on the side of the access network device. The terminal device does not need to report an index of a quantized value obtained by quantizing each element in $W_2$. This greatly reduces CSI feedback overheads of the terminal device, and allows uplink resources to be more effectively used.

Figure 3:
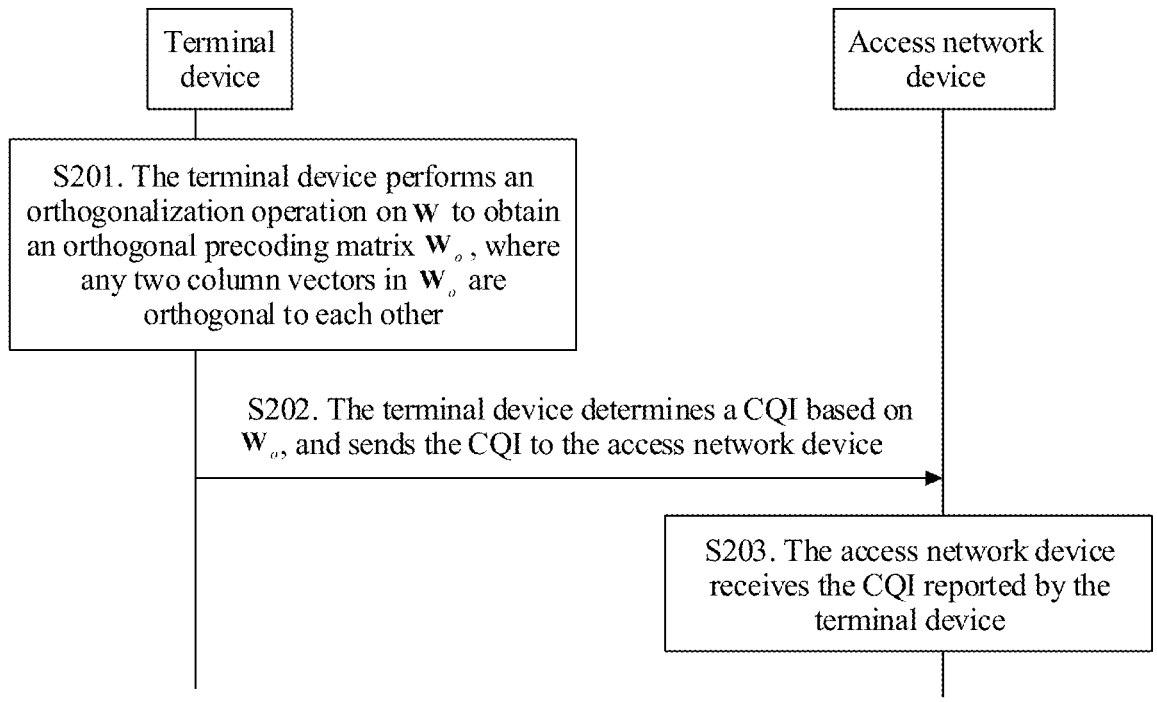
FIG. 3 is a signaling flowchart of a channel state information transmission method according to an embodiment.

FIG. 3 is a schematic signaling flowchart of a channel state information transmission method according to an embodiment. This embodiment involves a specific process in which a terminal device reports a CQI to an access network device, and the access network device performs an orthogonalization operation on an obtained precoding matrix W. Based on the foregoing embodiment, further, after step S101, the method may further include the following steps.

S201. The terminal device performs an orthogonalization operation on W to obtain an orthogonal precoding matrix $W_0$, where any two column vectors in $W_0$ are orthogonal to each other.

S202. The terminal device determines a CQI based on $W_0$, and sends the CQI to the access network device.

Specifically, there is no strict limitation on a sequential relationship between step S102, and step S201 and step S202. For example, step S201 and step S202 may be performed at the same time as step S102, or may be performed before step S102. This is not limited in this embodiment. In this embodiment, after determining the precoding matrix W, the terminal device may perform the orthogonalization operation on W to obtain the orthogonal precoding matrix $W_0$. Optionally, "orthogonal" herein may be "completely orthogonal", or may be "approximately orthogonal". Then, the terminal device may determine the CQI based on the orthogonal precoding matrix $W_0$, and report the CQI to the access network device. This improves CQI precision. For a manner of determining the CQI by using the precoding matrix $W_0$, refer to a manner of determining a CQI by using a precoding matrix W in the prior art. Details are not described herein. Optionally, the orthogonalization operation may include any one of the following operations: Schmidt orthogonalization, a zero-forcing algorithm, SVD decomposition, and QR decomposition.

It should be noted that when a rank of the precoding matrix W is equal to 2, the orthogonalization operation may be performed on W, and the CQI is calculated based on the obtained orthogonal precoding matrix and is reported. Optionally, when the CQI is reported, the CQI may be separately reported to the access network device, or may be added to CSI and reported to the access network device.

S203. The access network device receives the CQI reported by the terminal device.

After receiving the CQI reported by the terminal device, the access network device may learn quality of a current downlink channel based on the CQI, and then deliver downlink data based on the CQI and the precoding matrix that is obtained based on the first PMI and the second PMI.

Optionally, after obtaining the precoding matrix W based on the first PMI and the second PMI, the access network device may perform the orthogonalization operation on W. For example, W is orthogonalized based on any one of the following operations: Schmidt orthogonalization, the zero-forcing algorithm, SVD decomposition, and QR decomposition, to obtain the orthogonal precoding matrix $W_0$. In this way, the access network device can send the downlink data based on the orthogonal precoding matrix $W_0$.

During sending of the downlink data, optionally, in a single-user scenario, the access network device may directly precode to-be-sent downlink data based on the orthogonal precoding matrix $W_0$, and deliver the encoded data to the terminal device. In a multi-user scenario, two terminal devices are used as an example. Assuming that a terminal device 1 and a terminal device 2 each report a first PMI and a second PIM to the access network device, the access network device determines two precoding matrices based on the received first PMIs and second PMIs respectively, where a precoding matrix $W_a$ corresponds to the terminal device 1, and a precoding matrix $W_b$ corresponds to the terminal device 2. The access network device may separately perform an orthogonalization operation on the precoding matrix $W_a$ and the precoding matrix $W_b$ to obtain an orthogonal precoding matrix $W_{ao}$ corresponding to $W_a$ and an orthogonal precoding matrix $W_{bo}$ corresponding to $W_b$. Then, the access network device may determine another orthogonal precoding matrix $W_{co}$ based on $W_{ao}$ and $W_{bo}$, where any two column vectors in $W_{co}$ are orthogonal to each other, and then separately precode, based on different column vectors in $W_{co}$, data to be sent to the terminal device 1 and data to be sent to the terminal device 2. This reduces mutual interference between downlink data in a sending process.

According to the channel state information transmission method provided in this embodiment, the terminal device performs the orthogonalization operation on the determined precoding matrix to obtain the orthogonal precoding matrix $W_0$, then determines the CQI based on $W_0$, and reports the CQI to the access network device. This improves the CQI precision, and allows the access network device to more effectively transmit data. In addition, the access network device performs the orthogonalization operation on the precoding matrix that is obtained based on the first PMI and the second PMI, to obtain the orthogonal precoding matrix $W_0$, and further delivers data to the terminal device based on $W_0$ and different user scenarios. This reduces the mutual interference between downlink data in the sending process, and improves data transmission efficiency.

It should be noted that all or some of the steps of the method embodiments may be implemented by a program instructing related hardware. The program may be stored in a computer readable storage medium. When the program runs, the steps of the method embodiments are performed. The foregoing storage medium includes: any medium that can store program code such as a ROM, a RAM, a magnetic disk, or an optical disc.

Figure 4:
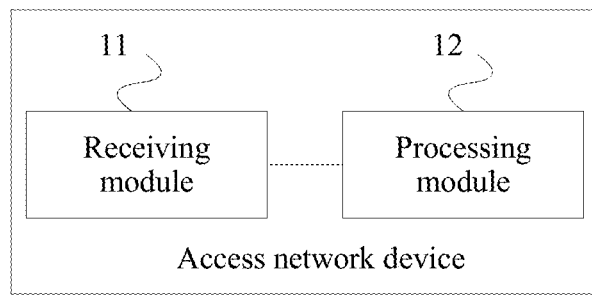
FIG. 4 is a schematic structural diagram of an embodiment of an access network device according to an embodiment.

FIG. 4 is a schematic structural diagram of an embodiment of an access network device according to an embodiment. As shown in FIG. 4, the access network device includes a receiving module 11 and a processing module 12.

Specifically, the receiving module 11 is configured to receive channel state information CSI reported by a terminal device, where the CSI includes a first precoding matrix indicator PMI and a second PMI.

The processing module 12 is configured to determine a precoding matrix W based on the first PMI and the second PMI, where $W_{meets} W=W_1 \times W_2$, where $W_1$ corresponds to the first PMI, $W_2$ corresponds to the second PMI, the second PMI is used to indicate some column vectors in W, and a rank of $W_2$ is greater than or equal to 2.

Optionally, the receiving module 11 may be implemented by using a corresponding receiver or receiver, for example, implemented by using a radio frequency module or a baseband module on the access network device. The processing module 12 may be implemented by using a corresponding component having a control function, for example, a processor, a micro control unit, or a digital processor.

Optionally, the second PMI includes an index of a quantized value obtained by quantizing each element other than a first element in $\left\lceil \frac{N}{2} \right\rceil$ columns of column vectors in $W_2$, where there is a preset association relationship between $N - \left\lceil \frac{N}{2} \right\rceil$ remaining column vectors in $W_2$ and the $\left\lceil \frac{N}{2} \right\rceil$ columns of column vectors, N is a quantity of columns of $W_2$, and the first element is an element that remains unchanged in the $\left\lceil \frac{N}{2} \right\rceil$ columns of column vectors.

Further, the second PMI specifically includes an index of a quantized value obtained by quantizing each element other than the first element in the first $\left\lceil \frac{N}{2} \right\rceil$ columns of column vectors in $W_2$, where there is a preset association relationship between $N - \left\lceil \frac{N}{2} \right\rceil$ remaining column vectors in $W_2$ and the first $\left\lceil \frac{N}{2} \right\rceil$ between columns of column vectors.

Optionally, the second PMI is further used to indicate an association relationship between the some column vectors and remaining column vectors other than the some column vectors in $W_2$.

Further, the second PMI includes an index of a quantized value obtained by quantizing each element other than a first element in $\left\lceil \frac{N}{2} \right\rceil$ columns of column vectors in $W_2$ and a relationship between $N - \left\lceil \frac{N}{2} \right\rceil$ remaining column vectors in $W_2$ and the $\left\lceil \frac{N}{2} \right\rceil$ columns of column vectors, N is a quantity of columns of $W_2$, and the first element is an element that remains unchanged in the $\left\lceil \frac{N}{2} \right\rceil$ columns of column vectors.

Still further, the second PMI specifically includes:
an index of a quantized value obtained by quantizing each element other than the first element in the first $\left\lceil \frac{N}{2} \right\rceil$ columns of column vectors in $W_2$ and an association relationship between the $N - \left\lceil \frac{N}{2} \right\rceil$ remaining column vectors in $W_2$ and the first $\left\lceil \frac{N}{2} \right\rceil$ columns of column vectors.

Still further, the association relationship between the $N - \left\lceil \frac{N}{2} \right\rceil$ remaining column vectors in $W_2$ and the first $\left\lceil \frac{N}{2} \right\rceil$ columns of column vectors specifically includes:
a phase association relationship between elements in a column vector in a $\left( k + \left\lceil \frac{N}{2} \right\rceil \right)^{th}$ column of $W_2$ and elements in a column vector in a $k^{th}$ column of $W_2$, where k is a positive integer in $$\left[1, \left\lceil \frac{N}{2} \right\rceil\right].$$

Optionally, $W_2$ represents a matrix including M rows and N columns, where M is an even number. In this case, the phase association relationship between the elements in the column vector in the $$\left(k + \left\lceil \frac{N}{2} \right\rceil\right)^{th}$$

column of $W_2$ and the elements in the column vector in the $k^{th}$ column of $W_2$ specifically includes:

$$c_{m,\left(k+\left\lceil \frac{N}{2} \right\rceil\right)} = a_m * c_{m,k},$$

where $c_{m,k}$ represents an element in an $m^{th}$ row and the $k^{th}$ column of $W_2$, $$c_{m,\left(k+\left\lceil \frac{N}{2} \right\rceil\right)}$$

represents an element in the $m^{th}$ row and the $$\left(k + \left\lceil \frac{N}{2} \right\rceil\right)^{th}$$

column of $W_2$, $$a_p * conj\left(a_{p+\frac{M}{2}}\right) = -1,$$

m is a positive integer in [1, M], p is a positive integer in $$\left[1, \frac{M}{2}\right],$$

and $a_1, a_2, \ldots, a_m$ are not completely the same.

Optionally, $\alpha_m \in \{1, -1, j, -j\}$.

Optionally, the processing module 12 is further configured to perform an orthogonalization operation on W to obtain an orthogonal precoding matrix $W_0$, where any two column vectors in $W_0$ are orthogonal to each other, and the orthogonalization operation includes any one of the following operations: Schmidt orthogonalization, a zero-forcing algorithm, SVD decomposition, and QR decomposition.

Optionally, the first PMI includes an index of amplitude information or an index of power information of a linear weighted value of each column vector in $W_1$ and an index of each column vector in $W_1$.

The access network device provided in this embodiment of this application may execute the foregoing method embodiment. Implementation principles and technical effects thereof are similar, and details are not described herein again.

Figure 5:
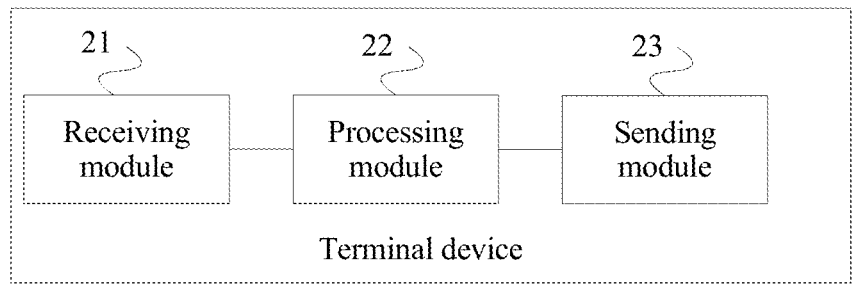
FIG. 5 is a schematic structural diagram of an embodiment of a terminal device according to an embodiment.

FIG. 5 is a schematic structural diagram of an embodiment of a terminal device according to an embodiment. As shown in FIG. 5, the terminal device includes a receiving module 21, a processing module 22, and a sending module 23.

Specifically, the processing module 22 is configured to determine a precoding matrix W based on a reference signal that is delivered by an access network device and that is received by the receiving module 21, where W meets $W = W_1 \times W_2$.

The sending module 23 is configured to send channel state information CSI to the access network device, where the CSI includes a first precoding matrix indicator PMI and a second PMI, $W_1$ corresponds to the first PMI, $W_2$ corresponds to the second PMI, the second PMI is used to indicate some column vectors in $W_2$, and a rank of W is greater than or equal to 2.

Optionally, the receiving module 21 may be implemented by using a corresponding receiver or receiver, for example, implemented by using a radio frequency module or a baseband module on the terminal device. The sending module 23 may be implemented by using a corresponding transmitter or transmitter, for example, implemented by using a radio frequency module or a baseband module on the terminal device. The processing module 22 may be implemented by using a corresponding component having a control function, for example, a processor, a micro control unit, or a digital processor.

Optionally, the second PMI includes an index of a quantized value obtained by quantizing each element other than a first element in $$\left\lceil \frac{N}{2} \right\rceil$$

columns of column vectors in $W_2$, where there is a preset association relationship between $$N - \left\lceil \frac{N}{2} \right\rceil$$

remaining column vectors in W $W_2$ and the $$\left\lceil \frac{N}{2} \right\rceil$$

columns of column vectors, N is a quantity of columns of $W_2$, and the first element is an element that remains unchanged in the $$\left\lceil \frac{N}{2} \right\rceil$$

columns of column vectors.

Further, the second PMI specifically includes an index of a quantized value obtained by quantizing each element other than the first element in the first $$\left\lceil \frac{N}{2} \right\rceil$$

columns of column vectors in $W_2$, where there is a preset association relationship between $$N - \lceil \frac{N}{2} \rceil$$

remaining column vectors in $W_2$ and the first $$\lceil \frac{N}{2} \rceil$$

columns of column vectors.

Optionally, the second PMI is further used to indicate an association relationship between the some column vectors and remaining column vectors other than the some column vectors in $W_2$.

Further, the second PMI includes an index of a quantized value obtained by quantizing each element other than a first element in $$\lceil \frac{N}{2} \rceil$$

columns of column vectors in $W_2$ and a relationship between $$N - \lceil \frac{N}{2} \rceil$$

remaining column vectors in $W_2$ and the $$\lceil \frac{N}{2} \rceil$$

columns of column vectors, N is a quantity of columns of $W_2$, and the first element is an element that remains unchanged in the $$\lceil \frac{N}{2} \rceil$$

columns of column vectors.

Still further, the second PMI specifically includes:
an index of a quantized value obtained by quantizing each element other than the first element in the first $$\lceil \frac{N}{2} \rceil$$

columns of column vectors in $W_2$ and an association relationship between the $$N - \lceil \frac{N}{2} \rceil$$

remaining column vectors in $W_2$ and the first $$\lceil \frac{N}{2} \rceil$$

columns of column vectors.

Still further, the association relationship between the $$N - \lceil \frac{N}{2} \rceil$$

remaining column vectors in $W_2$ and the first $$\lceil \frac{N}{2} \rceil$$

columns of column vectors specifically includes:
a phase association relationship between elements in a column vector in a $$\left(k + \lceil \frac{N}{2} \rceil\right)^{th}$$

column of $W_2$ and elements in a column vector in a $k^{th}$ column of $W_2$, where k is a positive integer in $$\left[1, \lceil \frac{N}{2} \rceil\right].$$

Optionally, $W_2$ represents a matrix including M rows and N columns, where M is an even number. In this case, the phase association relationship between the elements in the column vector in the $$\left(k + \lceil \frac{N}{2} \rceil\right)^{th}$$

column of $W_2$ and the elements in the column vector in the $k^{th}$ column of $W_2$ specifically includes:

$$c_{m,(k+\lceil \frac{N}{2} \rceil)} = a_m * c_{m,k},$$

where $c_{m,k}$ represents an element in an $m^{th}$ row and the $k^{th}$ column of $W_2$, $$c_{m,(k+\lceil \frac{N}{2} \rceil)}$$

represents an element in the $m^{th}$ row and the $$(k+\lceil\tfrac{N}{2}\rceil)^{th}$$

column of $W_2$, $$a_p * conj(a_{p+\tfrac{M}{2}}) = -1,$$

m is a positive integer in [1, M], p is a positive integer in $$[1, \tfrac{M}{2}],$$

and $a_1, a_2, \ldots, a_m$ are not completely the same.

Optionally $\alpha_m 531 \{1,-1,j,-j\}$.

Optionally, the processing module 22 is further configured to: perform an orthogonalization operation on W to obtain an orthogonal precoding matrix $W_0$, and determine a CQI based on $W_0$, where any two column vectors in $W_0$ are orthogonal to each other, and the orthogonalization operation includes any one of the following operations: Schmidt orthogonalization, a zero-forcing algorithm, SVD decomposition, and QR decomposition.

The sending module 23 is further configured to send the CQI to the access network device.

Optionally, the first PMI includes an index of amplitude information or an index of power information of a linear weighted value of each column vector in $W_1$ and an index of each column vector in $W_1$.

The terminal device provided in this embodiment of this application may execute the foregoing method embodiment. Implementation principles and technical effects thereof are similar, and details are not described herein again.

Figure 6:
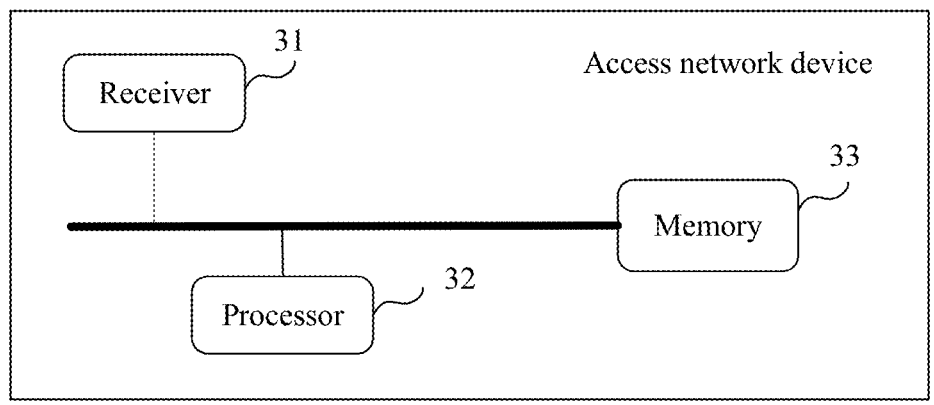
FIG. 6 is a schematic structural diagram of another embodiment of an access network device according to an embodiment.

FIG. 6 is a schematic structural diagram of another embodiment of an access network device. As shown in FIG. 6, the network device may include a receiver 31, a processor 32, and a memory 33. The memory 33 may be a high-speed RAM memory or a non-volatile memory NVM, for example, at least one magnetic memory. The memory 33 may store various programs used to implement various processing functions and implement steps of a method in this embodiment. Optionally, the receiver 31 in this embodiment may be a radio frequency module or a baseband module on the access network device.

In this embodiment, the receiver 31 is configured to receive channel state information CSI reported by a terminal device, where the CSI includes a first precoding matrix indicator PMI and a second PMI.

The processor 32 is configured to determine a precoding matrix W based on the first PMI and the second PMI, where W meets $W = X_1 \times W_2$, where $W_1$ corresponds to the first PMI, $W_2$ corresponds to the second PMI, the second PMI is used to indicate some column vectors in $W_2$, and a rank of W is greater than or equal to 2.

Optionally, the second PMI includes an index of a quantized value obtained by quantizing each element other than a first element in $$\lceil\tfrac{N}{2}\rceil$$

columns of column vectors in $W_2$, where there is a preset association relationship between $$N - \lceil\tfrac{N}{2}\rceil$$

remaining column vectors in $W_2$ and the $$\lceil\tfrac{N}{2}\rceil$$

columns of column vectors, N is a quantity of columns of $W_2$, and the first element is an element that remains unchanged in the $$\lceil\tfrac{N}{2}\rceil$$

columns of column vectors.

Further, the second PMI specifically includes an index of a quantized value obtained by quantizing each element other than the first element in the first $$\lceil\tfrac{N}{2}\rceil$$

columns of column vectors in $W_2$, where there is a preset association relationship between $$N - \lceil\tfrac{N}{2}\rceil$$

remaining column vectors in $W_2$ and the first $$\lceil\tfrac{N}{2}\rceil$$

columns of column vectors.

Optionally, the second PMI is further used to indicate an association relationship between the some column vectors and remaining column vectors other than the some column vectors in $W_2$.

Further, the second PMI includes an index of a quantized value obtained by quantizing each element other than a first element in $$\lceil\tfrac{N}{2}\rceil$$

columns of column vectors in $W_2$ and a relationship between $$N - \left\lceil \frac{N}{2} \right\rceil$$

remaining column vectors in $W_2$ and the $$\left\lceil \frac{N}{2} \right\rceil$$

columns of column vectors, N is a quantity of columns of $W_2$, and the first element is an element that remains unchanged in the $$\left\lceil \frac{N}{2} \right\rceil$$

columns of column vectors.

Still further, the second PMI specifically includes:
an index of a quantized value obtained by quantizing each element other than the first element in the first $$\left\lceil \frac{N}{2} \right\rceil$$

columns of column vectors in $W_2$ and an association relationship between the $$N - \left\lceil \frac{N}{2} \right\rceil$$

remaining column vectors in $W_2$ and the first $$\left\lceil \frac{N}{2} \right\rceil$$

columns of column vectors.

Still further, the association relationship between the $$N - \left\lceil \frac{N}{2} \right\rceil$$

remaining column vectors in $W_2$ and the first $$\left\lceil \frac{N}{2} \right\rceil$$

columns of column vectors specifically includes:
a phase association relationship between elements in a column vector in a $$\left(k + \left\lceil \frac{N}{2} \right\rceil\right)^{th}$$

column of $W_2$ and elements in a column vector in a $k^{th}$ column of $W_2$, where k is a positive integer in $$\left[1, \left\lceil \frac{N}{2} \right\rceil\right].$$

Optionally, $W_2$ represents a matrix including M rows and N columns, where M is an even number. In this case, the phase association relationship between the elements in the column vector in the $$\left(k + \left\lceil \frac{N}{2} \right\rceil\right)^{th}$$

column of $W_2$ and the elements in the column vector in the $k^{th}$ column of $W_2$ specifically includes:

$$c_{m,(k+\lceil \frac{N}{2} \rceil)} = a_m * c_{m,k},$$

where $c_{m,k}$ represents an element in an $m^{th}$ row and the $k^{th}$ column of $W_2$, $$c_{m,(k+\lceil \frac{N}{2} \rceil)}$$

represents an element in the $m^{th}$ row and the $$\left(k + \left\lceil \frac{N}{2} \right\rceil\right)^{th}$$

column of $W_2$, $$a_p * conj\left(a_{p+\frac{M}{2}}\right) = -1,$$

m is a positive integer in [1, M], p is a positive integer in $$\left[1, \frac{M}{2}\right],$$

and $a_1, a_2, \ldots, a_m$ are not completely the same.

Optionally, $\alpha_m \in \{1, -1, j, -j\}$.

Optionally, the processor 32 is further configured to perform an orthogonalization operation on W to obtain an orthogonal precoding matrix $W_0$, where any two column vectors in $W_0$ are orthogonal to each other, and the orthogonalization operation includes any one of the following operations: Schmidt orthogonalization, a zero-forcing algorithm, SVD decomposition, and QR decomposition.

Optionally, the first PMI includes an index of amplitude information or an index of power information of a linear weighted value of each column vector in $W_1$ and an index of each column vector in $W_1$.

The access network device provided in this embodiment may execute the foregoing method embodiment. Implementation principles and technical effects thereof are similar, and details are not described herein again.

Figure 7:
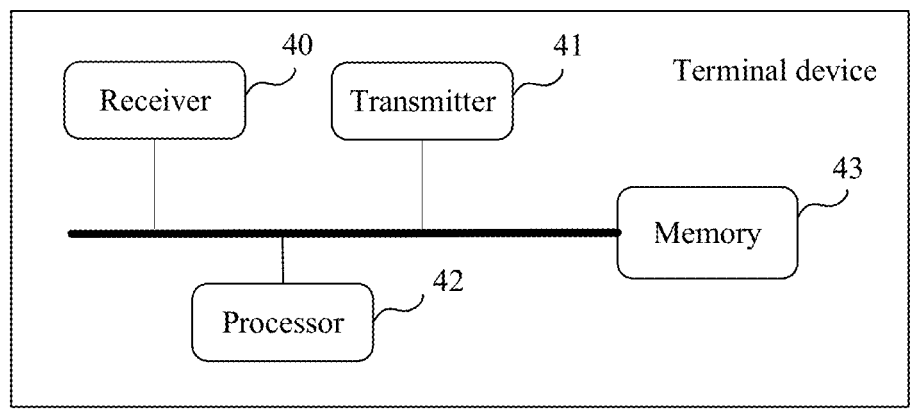
FIG. 7 is a schematic structural diagram of another embodiment of a terminal device according to an embodiment.

FIG. 7 is a schematic structural diagram of another embodiment of a terminal device. As shown in FIG. 7, the terminal device may include a receiver 40, a transmitter 41, a processor 42, and a memory 43. The memory 43 may be a high-speed RAM memory or a non-volatile memory NVM, for example, at least one magnetic memory. The memory 43 may store various programs used to implement various processing functions and implement steps of a method in this embodiment. Optionally, the receiver 40 and the receiver 41 in this embodiment may be radio frequency modules or baseband modules on the terminal device.

In this embodiment, the processor 42 configured to determine a precoding matrix W based on a reference signal that is delivered by an access network device and that is received by the receiver 40, where W meets $W=W_1 \times W_2$.

The transmitter 41 is configured to send channel state information CSI to the access network device, where the CSI includes a first precoding matrix indicator PMI and a second PMI, $W_1$ corresponds to the first PMI, $W_2$ corresponds to the second PMI, the second PMI is used to indicate some column vectors in $W_2$, and a rank of W is greater than or equal to 2.

Optionally, the second PMI includes an index of a quantized value obtained by quantizing each element other than a first element in $$\left\lceil \frac{N}{2} \right\rceil$$

columns of column vectors in $W_2$, where there is a preset association relationship between $$N - \left\lceil \frac{N}{2} \right\rceil$$

remaining column vectors in $W_2$ and the $$\left\lceil \frac{N}{2} \right\rceil$$

columns of column vectors, N is a quantity of columns of $W_2$, and the first element is an element that remains unchanged in the $$\left\lceil \frac{N}{2} \right\rceil$$

columns of column vectors.

Further, the second PMI specifically includes an index of a quantized value obtained by quantizing each element other than the first element in the first $$\left\lceil \frac{N}{2} \right\rceil$$

columns of column vectors in $W_2$, where there is a preset association relationship between $$N - \left\lceil \frac{N}{2} \right\rceil$$

remaining column vectors in $W_2$ and the first $$\left\lceil \frac{N}{2} \right\rceil$$

columns of column vectors.

Optionally, the second PMI is further used to indicate an association relationship between the some column vectors and remaining column vectors other than the some column vectors in $W_2$.

Further, the second PMI includes an index of a quantized value obtained by quantizing each element other than a first element in $$\left\lceil \frac{N}{2} \right\rceil$$

columns of column vectors in $W_2$ and a relationship between $$N - \left\lceil \frac{N}{2} \right\rceil$$

remaining column vectors in $W_2$ and the $$\left\lceil \frac{N}{2} \right\rceil$$

columns of column vectors, N is a quantity of columns of $W_2$, and the first element is an element that remains unchanged in the $$\left\lceil \frac{N}{2} \right\rceil$$

columns of column vectors.

Still further, the second PMI specifically includes:
an index of a quantized value obtained by quantizing each element other than the first element in the first $$\left\lceil \frac{N}{2} \right\rceil$$

columns of column vectors in $W_2$ and an association relationship between the $$N - \left\lceil \frac{N}{2} \right\rceil$$

remaining column vectors in $W_2$ and the first $$\left\lceil \frac{N}{2} \right\rceil$$

columns of column vectors.

Still further, the association relationship between the $$N - \left\lceil \frac{N}{2} \right\rceil$$

remaining column vectors in $W_2$ and the first $$\left\lceil \frac{N}{2} \right\rceil$$

columns of column vectors specifically includes:

a phase association relationship between elements in a column vector in a $$\left(k + \left\lceil \frac{N}{2} \right\rceil\right)^{th}$$

column of $W_2$ and elements in a column vector in a $k^{th}$ column of $W_2$, where k is a positive integer in $$\left[1, \left\lceil \frac{N}{2} \right\rceil\right].$$

Optionally, $W_2$ represents a matrix including M rows and N columns, where M is an even number. In this case, the phase association relationship between the elements in the column vector in the $$\left(k + \left\lceil \frac{N}{2} \right\rceil\right)^{th}$$

column of $W_2$ and the elements in the column vector in the $k^{th}$ column of $W_2$ specifically includes:

$$c_{m,(k+\lceil \frac{N}{2} \rceil)} = a_m * c_{m,k},$$

where $c_{m,k}$ represents an element in an $m^{th}$ row and the $k^{th}$ column of $W_2$, $$c_{m,(k+\lceil \frac{N}{2} \rceil)}$$

represents an element in the $m^{th}$ row and the $$\left(k + \left\lceil \frac{N}{2} \right\rceil\right)^{th}$$

column of $W_2$, $$a_p * conj(a_{p+\frac{M}{2}}) = -1,$$

m is a positive integer in [1, M], p is a positive integer in $$\left[1, \frac{M}{2}\right],$$

and $a_1, a_2, \ldots, a_m$ are not completely the same.

Optionally, $\alpha_m \in \{1, -1, j, -j\}$.

Optionally, the processor 42 is further configured to perform an orthogonalization operation on W to obtain an orthogonal precoding matrix $W_0$, and determine a CQI based on $W_0$, where any two column vectors in $W_0$ are orthogonal to each other, and the orthogonalization operation includes any one of the following operations: Schmidt orthogonalization, a zero-forcing algorithm, SVD decomposition, and QR decomposition.

The transmitter 41 is further configured to send the CQI to the access network device.

Optionally, the first PMI includes an index of amplitude information or an index of power information of a linear weighted value of each column vector in W and an index of each column vector in $W_1$.

The terminal device provided in this embodiment of this application may execute the foregoing method embodiment. Implementation principles and technical effects thereof are similar, and details are not described herein again.

Method or algorithm steps described with reference to the content disclosed in this application may be implemented by hardware, or may be implemented by a processor by executing a software instruction, or may be implemented by a computer program product. The software instruction may be formed by a corresponding software module. The software module may be stored in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

In the foregoing one or more examples, functions described may be implemented by hardware, software, firmware, or any combination thereof. When being implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or dedicated computer.

It should be understood that, in the several embodiments provided in this application, the disclosed system, device, and method may be implemented in other manners without departing from the scope of this application. For example, the described embodiments are merely examples. For example, the module or unit division is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments.

In addition, the schematic diagrams illustrating the system, device, method, and different embodiments may be combined or integrated with other systems, modules, technologies, or methods without departing from the scope of this application. In addition, the displayed or discussed mutual couplings or direct couplings or communication connections may be implemented by using some interfaces. The indirect couplings or communication connections between the apparatuses or units may be implemented in electronic, mechanical, or other forms.

Finally, it should be noted that the foregoing embodiments are merely intended for describing the technical solutions of this application rather than limiting this application.

What is claimed is:

1. A channel state information transmission method, comprising:
    receiving, by an access network device, channel state information (CSI) reported by a terminal device, wherein the CSI comprises a first precoding matrix indicator (PMI) and a second PMI; and
    determining, by the access network device, a precoding matrix W based on the first PMI and the second PMI, wherein W satisfies $W=W_1 \times W_2$, wherein $W_1$ is determined based on the first PMI, wherein $W_2$ is determined based on the second PMI, and wherein when a rank of W is greater than or equal to 2, the terminal device needs to report only the second PMI used to indicate one or more column vectors in $W_2$ to reduce overheads of feeding back, wherein the rank of the precoding matrix W is a dimension of a vector space generated by columns of W.

2. The method according to claim 1, wherein the second PMI comprises an index of a quantized value obtained by quantizing each element other than a first element in $$\left\lceil \frac{N}{2} \right\rceil$$

columns of column vectors in $W_2$, wherein a preset association relationship exists between $$N - \left\lceil \frac{N}{2} \right\rceil$$

remaining column vectors in $W_2$ and the $$\left\lceil \frac{N}{2} \right\rceil$$

columns of column vectors, N is a quantity of columns of $W_2$, and the first element is an element that remains unchanged in the $$\left\lceil \frac{N}{2} \right\rceil$$

columns of column vectors.

3. The method according to claim 2, wherein the second PMI comprises an index of a quantized value obtained by quantizing each element other than the first element in the first $$\left\lceil \frac{N}{2} \right\rceil$$

columns of column vectors in $W_2$, wherein a preset association relationship between $$N - \left\lceil \frac{N}{2} \right\rceil$$

remaining column vectors in $W_2$ and the first $$\left\lceil \frac{N}{2} \right\rceil$$

columns of column vectors.

4. The method according to claim 1, wherein the second PMI is used to indicate an association relationship between one or more column vectors and remaining column vectors in $W_2$.

5. The method according to claim 4, wherein the second PMI comprises an index of a quantized value obtained by quantizing each element other than a first element in $$\left\lceil \frac{N}{2} \right\rceil$$

columns of column vectors in $W_2$ and a relationship exists between $$N - \left\lceil \frac{N}{2} \right\rceil$$

remaining column vectors in $W_2$ and the $$\left\lceil \frac{N}{2} \right\rceil$$

columns of column vectors, N is a quantity of columns of $W_2$, and the first element is an element that remains unchanged in the $$\left\lceil \frac{N}{2} \right\rceil$$

columns of column vectors.

6. The method according to claim 5, wherein the second PMI comprises:
    an index of a quantized value obtained by quantizing each element other than the first element in the first columns of column vectors in $W_2$ and an association relationship exists between the $$\left\lceil \frac{N}{2} \right\rceil$$

$$N - \left\lceil \frac{N}{2} \right\rceil$$

remaining column vectors in $W_2$ and the first $$\left\lceil \frac{N}{2} \right\rceil$$

columns of column vectors.

7. The method according to claim 6, wherein the association relationship that exists between the $$N - \left\lceil \frac{N}{2} \right\rceil$$

remaining column vectors in $W_2$ and the first $$\left\lceil \frac{N}{2} \right\rceil$$

columns of column vectors comprises:
a phase association relationship between elements in a column vector in a $$\left(k + \left\lceil \frac{N}{2} \right\rceil\right)^{th}$$

column of $W_2$ and elements in a column vector in a $k^{th}$ column of $W_2$, wherein k is a positive integer in $$\left[1, \left\lfloor \frac{N}{2} \right\rfloor\right].$$

8. The method according to claim 7, wherein $W_2$ represents a matrix comprising M rows and N columns, M is an even number, and in this case, the phase association relationship between the elements in the column vector in $$\left(k + \left\lceil \frac{N}{2} \right\rceil\right)^{th}$$

column of $W_2$ and the elements in the column vector in the $k^{th}$ column of $W_2$ comprises:

$$c_{m,(k+\lceil \frac{N}{2} \rceil)} = a_m * c_{m,k},$$

wherein $C_{m,k}$ represents an element in an $m^{th}$ row and the $k^{th}$ column of $W_2$, $$c_{m,(k+\lceil \frac{N}{2} \rceil)}$$

represents an element in the $m^{th}$ row and the $$\left(k + \left\lceil \frac{N}{2} \right\rceil\right)^{th}$$

column of $W_2$, $$a_p * conj\left(a_{p+\frac{M}{2}}\right) = -1,$$

m is a positive integer in [1, M], p is a positive integer in $$\left[1, \frac{M}{2}\right],$$

and $a_1, a_2, \ldots, a_m$ are not identical.

9. A channel state information transmission method, comprising:
determining, by a terminal device, a precoding matrix W based on a reference signal delivered by an access network device, wherein W is defined as $W = W_1 \times W_2$; and
sending, by the terminal device, channel state information (CSI) to the access network device, wherein the CSI comprises a first precoding matrix indicator (PMI) and a second PMI, wherein $W_1$ is determined based on the first PMI, wherein $W_2$ is determined based on the second PMI, and wherein when a rank of W is greater than or equal to 2, the terminal device needs to report only the second PMI used to indicate one or more column vectors in $W_2$ to reduce overheads of feeding back, wherein the rank of the precoding matrix W is a dimension of a vector space generated by columns of W.

10. The method according to claim 9, wherein the second PMI comprises an index of a quantized value obtained by quantizing each element other than a first element in $$\left\lceil \frac{N}{2} \right\rceil$$

columns of column vectors in $W_2$, wherein a preset association relationship exists between $$N - \left\lceil \frac{N}{2} \right\rceil$$

remaining column vectors in $W_2$ and the $$\left\lceil \frac{N}{2} \right\rceil$$

columns of column vectors, N is a quantity of columns of $W_2$, and the first element is an element that remains unchanged in the $\lceil \frac{N}{2} \rceil$ columns of column vectors.

11. The method according to claim 10, wherein the second PMI comprises an index of a quantized value obtained by quantizing each element other than the first element in the first $\lceil \frac{N}{2} \rceil$ columns of column vectors in $W_2$, wherein a preset association relationship exists between $N - \lceil \frac{N}{2} \rceil$ remaining column vectors in $W_2$ and the first $\lceil \frac{N}{2} \rceil$ columns of column vectors.

12. The method according to claim 9, wherein the second PMI is used to indicate an association relationship between the some column vectors and remaining column vectors other than one or more column vectors in $W_2$.

13. The method according to claim 12, wherein the second PMI comprises an index of a quantized value obtained by quantizing each element other than a first element in $\lceil \frac{N}{2} \rceil$ columns of column vectors in $W_2$ and a relationship exists between $N - \lceil \frac{N}{2} \rceil$ remaining column vectors in $W_2$ and the $\lceil \frac{N}{2} \rceil$ columns of column vectors, N is a quantity of columns of $W_2$, and the first element is an element that remains unchanged in the $\lceil \frac{N}{2} \rceil$ columns of column vectors.

14. The method according to claim 13, wherein the second PMI comprises:

an index of a quantized value obtained by quantizing each element other than the first element in the first $\lceil \frac{N}{2} \rceil$ columns of column vectors in $W_2$ and an association relationship exists between the $N - \lceil \frac{N}{2} \rceil$ remaining column vectors in $W_2$ and the first $\lceil \frac{N}{2} \rceil$ columns of column vectors.

15. The method according to claim 14, wherein the association relationship between the $N - \lceil \frac{N}{2} \rceil$ remaining column vectors in $W_2$ and the first $\lceil \frac{N}{2} \rceil$ columns of column vectors comprises:

a phase association relationship between elements in a column vector in a $\left(k + \lceil \frac{N}{2} \rceil\right)^{th}$ column of $W_2$ and elements in a column vector in a $k^{th}$ column of $W_2$, wherein k is a positive integer in $\left[1, \lceil \frac{N}{2} \rceil\right]$.

16. The method according to claim 15, wherein $W_2$ represents a matrix comprising M rows and N columns, M is an even number and the phase association relationship between the elements in the column vector in the $\left(k + \lceil \frac{N}{2} \rceil\right)^{th}$ column of $W_2$ and the elements in the column vector in the $k^{th}$ column of $W_2$ comprises:

$$c_{m,(k+\lceil \frac{N}{2} \rceil)} = a_m * c_{m,k},$$

wherein $c_{m,k}$ represents an element in an $m^{th}$ row and the $k^{th}$ column of $W_2$, $$c_{m,(k+\lceil \frac{N}{2} \rceil)}$$

represents an element in the $m^{th}$ row and the $$\left(k+\left\lceil \frac{N}{2} \right\rceil\right)^{th}$$

column of $W_2$, $$a_p * conj\left(a_{p+\frac{M}{2}}\right) = -1,$$

m is a positive integer in [1, M], p is a positive integer in $$\left[1, \frac{M}{2}\right],$$

and $a_1, a_2, \ldots, a_m$ are not identical.

17. An apparatus, comprising a receiver, a processor, and a transmitter, wherein
the processor is configured to determine a precoding matrix W based on a reference signal that is delivered by an access network device and that is received by the receiver, wherein W satisfies $W=W_1 \times W_2$; and
the transmitter is configured to send channel state information (CSI) to the access network device, wherein the CSI comprises a first precoding matrix indicator (PMI) and a second PMI, wherein $W_1$ is determined based on the first PMI, wherein $W_2$ is determined based on the second PMI, and wherein when a rank of W is greater than or equal to 2, the terminal device needs to report only the second PMI used to indicate one or more column vectors in $W_2$ to reduce overheads of feeding back, wherein the rank of the precoding matrix W is a dimension of a vector space generated by columns of W.

18. The apparatus according to claim 17, wherein the second PMI comprises an index of a quantized value obtained by quantizing each element other than a first element in $$\left\lceil \frac{N}{2} \right\rceil$$

columns of column vectors in $W_2$, wherein a preset association relationship exists between $$N - \left\lceil \frac{N}{2} \right\rceil$$

remaining column vectors in $W_2$ and the $$\left\lceil \frac{N}{2} \right\rceil$$

columns of column vectors, N is a quantity of columns of $W_2$, and the first element is an element that remains unchanged in the $$\left\lceil \frac{N}{2} \right\rceil$$

columns of column vectors.

19. The apparatus according to claim 17, wherein the second PMI comprises an index of a quantized value obtained by quantizing each element other than the first element in the first $$\left\lceil \frac{N}{2} \right\rceil$$

columns of column vectors in $W_2$, wherein a preset association relationship exists between $$N - \left\lceil \frac{N}{2} \right\rceil$$

remaining column vectors in $W_2$ and the first $$\left\lceil \frac{N}{2} \right\rceil$$

columns of column vectors.

20. The apparatus according to claim 17, wherein the second PMI is used to indicate an association relationship between one or more column vectors and remaining column vectors in $W_2$.

* * * * *